US011764885B2

(12) United States Patent
van Erven et al.

(10) Patent No.: US 11,764,885 B2
(45) Date of Patent: Sep. 19, 2023

(54) SYSTEMS AND METHODS FOR STATE DETECTION VIA WIRELESS RADIOS

(71) Applicant: Sonos, Inc., Santa Barbara, CA (US)

(72) Inventors: Niels van Erven, Agoura Hills, CA (US); Connor Riley Northend, Goleta, CA (US)

(73) Assignee: Sonos, Inc., Santa Barbara, CA (US)

( * ) Notice: Subject to any disclaimer, the term of this patent is extended or adjusted under 35 U.S.C. 154(b) by 0 days.

(21) Appl. No.: 18/065,562

(22) Filed: Dec. 13, 2022

(65) Prior Publication Data

US 2023/0112654 A1     Apr. 13, 2023

Related U.S. Application Data

(63) Continuation of application No. 17/204,793, filed on Mar. 17, 2021, now Pat. No. 11,533,116.

(60) Provisional application No. 62/992,027, filed on Mar. 19, 2020.

(51) Int. Cl.
    *H04B 17/27*      (2015.01)
    *H04W 16/22*      (2009.01)
    *H04B 17/318*     (2015.01)

(52) U.S. Cl.
    CPC .......... *H04B 17/318* (2015.01); *H04B 17/27* (2015.01); *H04W 16/225* (2013.01)

(58) Field of Classification Search
None
See application file for complete search history.

(56) References Cited

U.S. PATENT DOCUMENTS

| 8,483,853 | B1* | 7/2013 | Lambourne | ............ H04H 60/80 |
| | | | | 709/217 |
| 10,679,673 | B2* | 6/2020 | Møller | ............... H04N 21/8547 |
| 2015/0081068 | A1* | 3/2015 | Cheng | ................... H04N 21/436 |
| | | | | 700/94 |
| 2017/0142535 | A1* | 5/2017 | Aggarwal | ............. H04L 65/613 |
| 2017/0171577 | A1* | 6/2017 | Kipp | ....................... G11B 27/10 |
| 2020/0092515 | A1* | 3/2020 | Stern | ................ H04N 21/43635 |

\* cited by examiner

*Primary Examiner* — Ajit Patel
(74) *Attorney, Agent, or Firm* — KPPB LLP

(57) ABSTRACT

Systems and methods for localizing individuals in a region using wireless signals in accordance with embodiments are illustrated. One embodiment includes a method for localizing individuals in a region between wireless devices of a system. The method receives wireless signal strength data for signals transmitted along signal paths between several wireless playback devices transmitting on a wireless channel during synchronous playback of media content by the several wireless playback devices and determines a first signal strength for each of several portions of the wireless channel. The method calculates, for each signal path between each of the several wireless playback devices, a difference in the determined first signal strength from a second signal strength for each of the several subcarriers, and determines, based on the calculated differences, a state for a set of one or more individuals in the region.

20 Claims, 19 Drawing Sheets

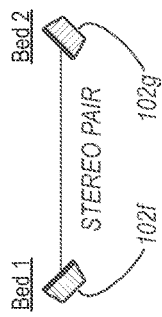
*Figure 3B*
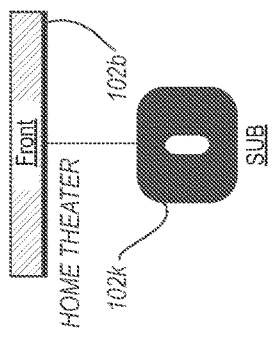
*Figure 3C*
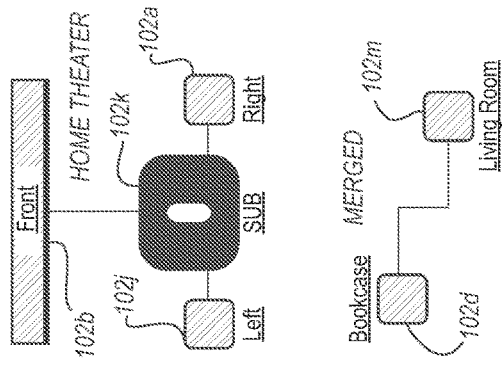
*Figure 3D*
*Figure 3E*
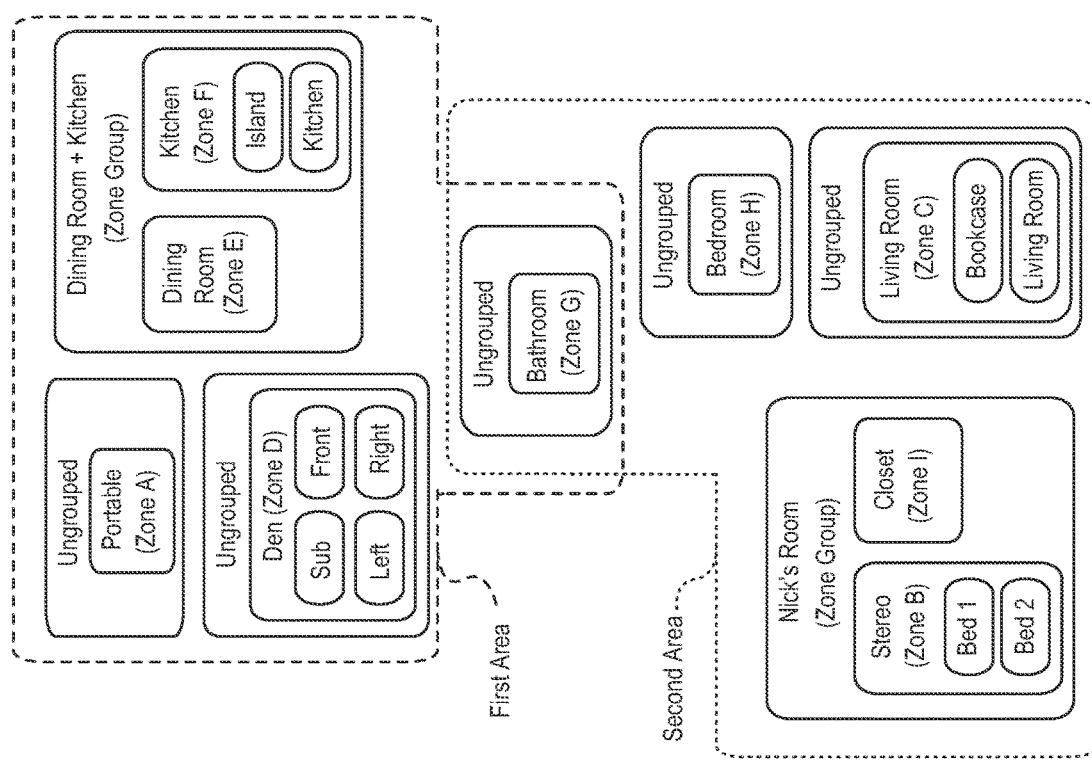
*Figure 3A*

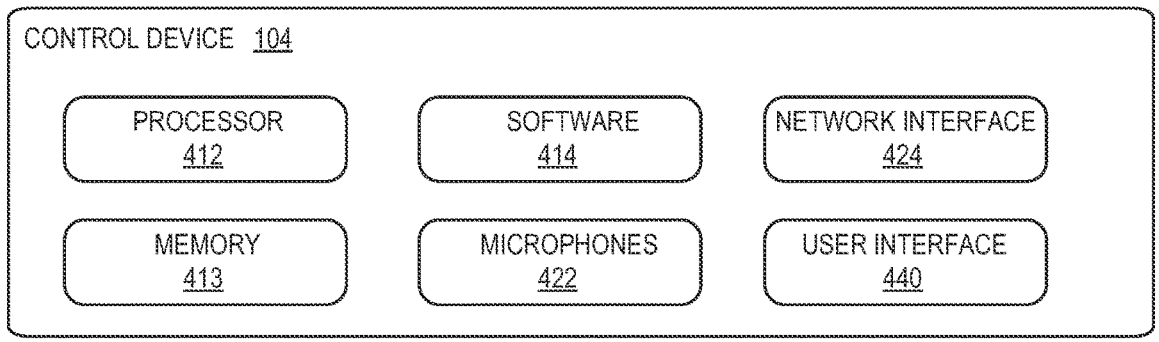
*Figure 4A*
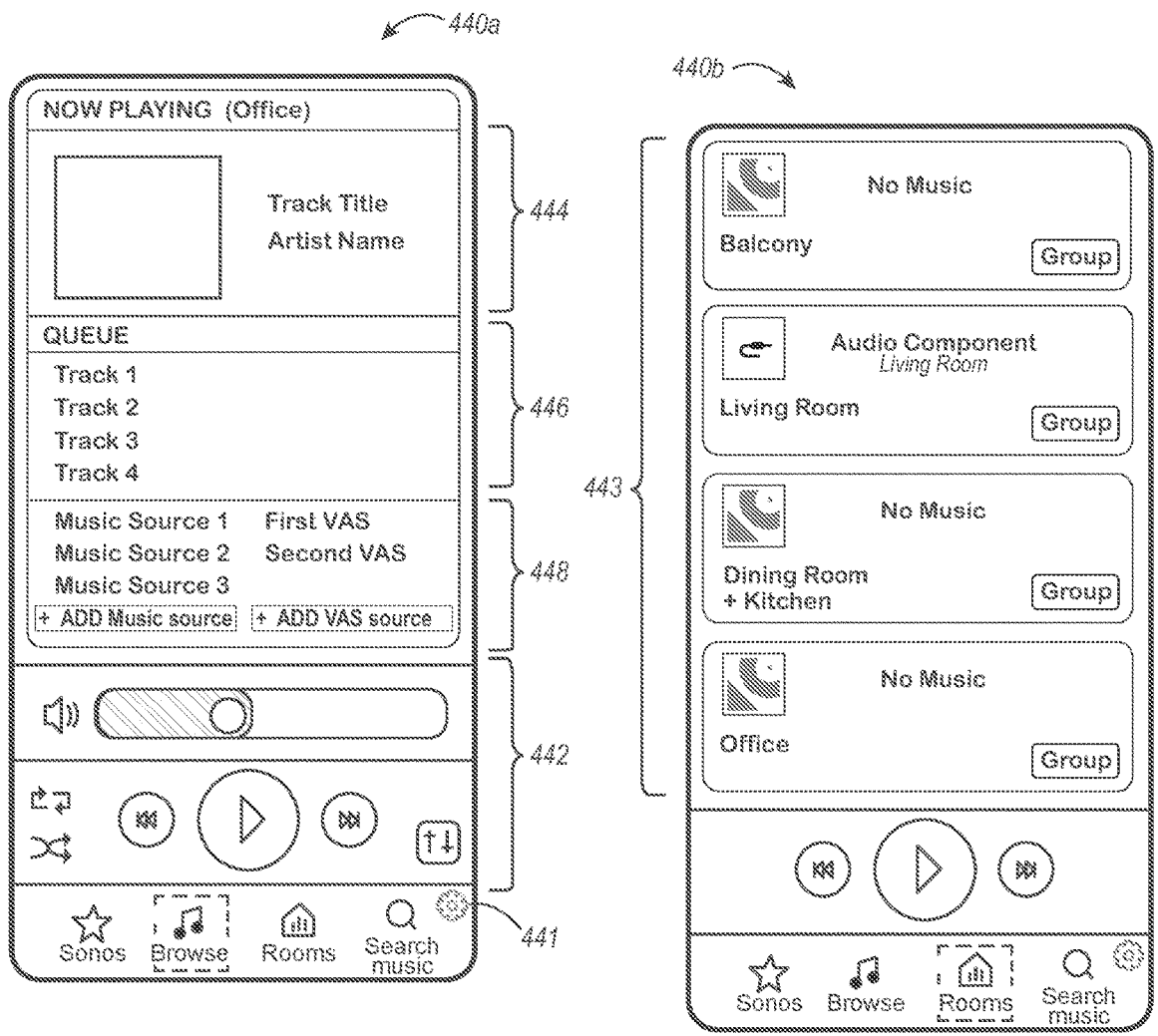
*Figure 4B*
*Figure 4C*

505

510

1105

1110

1215

1305

1310

SYSTEMS AND METHODS FOR STATE DETECTION VIA WIRELESS RADIOS

CROSS REFERENCE TO RELATED APPLICATIONS

This application is a continuation of U.S. patent application Ser. No. 17/204,793, filed on Mar. 17, 2021, titled "SYSTEMS AND METHODS FOR STATE DETECTION VIA WIRELESS RADIOS," which claims priority to U.S. Provisional Patent Application No. 62/992,027, filed on Mar. 19, 2020, titled "SYSTEMS AND METHODS FOR LOCALIZATION VIA WIRELESS RADIOS," the disclosures of which are incorporated herein by reference in their entireties.

TECHNICAL FIELD

The present technology relates to consumer goods and, more particularly, to methods, systems, products, features, services, and other elements directed to state detection of individuals using transmitted wireless signal strength or some aspect thereof.

BACKGROUND

Options for accessing and listening to digital audio in an out-loud setting were limited until in 2003, when SONOS, Inc. filed for one of its first patent applications, entitled "Method for Synchronizing Audio Playback between Multiple Networked Devices," and began offering a media playback system for sale in 2005. The SONOS Wireless HiFi System enables people to experience music from many sources via one or more networked playback devices. Through a software control application installed on a smartphone, tablet, or computer, one can play what he or she wants in any room that has a networked playback device. Additionally, using a controller, for example, different songs can be streamed to each room that has a playback device, rooms can be grouped together for synchronous playback, or the same song can be heard in all rooms synchronously.

Given the ever-growing interest in digital media, there continues to be a need to develop consumer-accessible technologies to further enhance the listening experience.

SUMMARY

Systems and methods for localizing individuals in a region using wireless signals in accordance with embodiments are illustrated. One embodiment includes a playback device comprising a wireless network interface configured to connect to at least one data network, one or more processors, one or more non-transitory computer-readable media, and program instructions stored on the one or more non-transitory computer-readable media. The program instructions are executable by the one or more processors such that the playback device is configured to receive wireless signal strength data for signals transmitted along signal paths between several wireless playback devices transmitting on a wireless channel during synchronous playback of media content by the several wireless playback devices and determine a first signal strength for each of several portions of the wireless channel. The program instructions are executable by the one or more processors such that the playback device is configured to calculate, for each signal path between each of the several wireless playback devices, a difference in the determined first signal strength from a second signal strength for each of the several subcarriers, and determine, based on the calculated differences, a state for a set of one or more individuals in the region.

In a further embodiment, the wireless signal strength data includes signal strengths for the several subcarriers of the wireless channel.

In still another embodiment, the signals transmitted along the signal paths includes at least one of audio data packets, synchronization packets, or null packets.

In a still further embodiment, the width of the wireless channel is greater than 13 megahertz (MHz) and a width of each subcarrier is less than one MHz.

In yet another embodiment, the program instructions that are executable by the one or more processors such that the playback device is configured to determine the first signal strength includes program instructions that are executable by the one or more processors such that the playback device is configured to determine a first directional signal strength in a first direction along a signal path between two wireless playback devices of the several playback devices, determine a second directional signal strength in a second direction along the signal path between the two wireless playback devices, and calculate a normalized signal strength based on the first and second directional signal strengths.

In a yet further embodiment, the several subcarriers include subcarriers at frequencies that are attenuated by water at a rate exceeding a given threshold.

In another additional embodiment, the method further includes steps for program instructions that are executable by the one or more processors such that the playback device is configured to apply a set of one or more denoising filters to the determined first signal strengths for the several subcarriers, wherein determining the state of the individual is based on the filtered first signal strengths.

In a further additional embodiment, the set of denoising filters includes at least one of a linear Kalman filter, an extended Kalman filter, or a moving horizon estimator.

In another embodiment again, the second signal strength is a baseline signal strength measured prior to the determined first signal strength.

In a further embodiment again, the program instructions that are executable by the one or more processors such that the playback device is configured to determine the state of the set of individuals includes program instructions that are executable by the one or more processors such that the playback device is configured to determine a number of individuals in the region.

In still yet another embodiment, the program instructions that are executable by the one or more processors such that the playback device is configured to determine the state of the set of individuals includes program instructions that are executable by the one or more processors such that the playback device is configured to determine a location of an individual in the region.

In a still yet further embodiment, the program instructions that are executable by the one or more processors such that the playback device is configured to determine the location includes program instructions that are executable by the one or more processors such that the playback device is configured to determine that the individual is in the line-of-sight path between two of the several wireless playback devices.

In still another additional embodiment, the program instructions that are executable by the one or more processors such that the playback device is configured to determine the state of the set of individuals includes program instructions that are executable by the one or more processors such that the playback device is configured to determine the state of the set of individuals using a model, wherein the model includes at least one of a convolutional neural network, a recurrent neural network, a decision tree, or a logistic regression.

In a still further additional embodiment, the method further includes steps for program instructions that are executable by the one or more processors such that the playback device is configured to receive state information that describes the region, wherein the state information includes at least one of the group consisting of room characteristics and locations of each of the playback devices, and determine a likelihood of background noise for each of the several subcarriers, wherein determining the state of the set of individuals is based on the determined likelihood of background noise.

In still another embodiment again, the method further includes steps for program instructions that are executable by the one or more processors such that the playback device is configured to modify the wireless playback system based on the determined state of the set of individuals.

In a still further embodiment again, the program instructions that are executable by the one or more processors such that the playback device is configured to modify the wireless playback system includes program instructions that are executable by the one or more processors such that the playback device is configured to adjust audio playback settings of at least one of the several wireless playback devices.

In yet another additional embodiment, the program instructions that are executable by the one or more processors such that the playback device is configured to determine the state of the set of individuals includes program instructions that are executable by the one or more processors such that the playback device is configured to determine a number of individuals in the region, and the program instructions that are executable by the one or more processors such that the playback device is configured to modify the wireless playback system includes program instructions that are executable by the one or more processors such that the playback device is configured to return the audio playback settings of the several wireless playback devices to a default setting when the number of individuals exceeds a threshold.

In a yet further additional embodiment, the method further includes steps for program instructions that are executable by the one or more processors such that the playback device is configured to detect unusual activity based on the determined state, and upon detecting unusual activity, initiate a safety measure, wherein the safety measure includes at least one of the group consisting of sending an alert to a mobile device, triggering an alarm, and initiating a recording of the region.

In yet another embodiment again, the program instructions that are executable by the one or more processors such that the playback device is configured to receive the wireless signal strength data includes program instructions that are executable by the one or more processors such that the playback device is configured to receive wireless signal strength data from a subset of the several wireless playback devices.

In a yet further embodiment again, the portions of the wireless channel are at least one of subcarriers or subchannels.

One embodiment includes a method for managing a playback system based on individuals within a region. The method includes steps for receiving wireless signal strength data for signals transmitted along signal paths between several wireless playback devices transmitting on a wireless channel during synchronous playback of media content by the several wireless playback devices and determining a first signal strength for each of several portions of the wireless channel. The method includes steps for calculating, for each signal path between each of the several wireless playback devices, a difference in the determined first signal strength from a second signal strength for each of the several subcarriers, and determining, based on the calculated differences, a state for a set of one or more individuals in the region.

One embodiment includes a non-transitory machine readable medium containing processor instructions, where execution of the instructions by at least one processor causes the at least one processor to perform a process. The process includes steps for receiving wireless signal strength data for signals transmitted along signal paths between several wireless playback devices transmitting on a wireless channel and determining a first signal strength for each of several subcarriers of the wireless channel. The process includes steps for calculating, for each signal path between each of the several wireless playback devices, a difference in the determined first signal strength from a second signal strength for each of the several subcarriers, and determining, based on the calculated differences, a state for a set of one or more individuals in the region.

One embodiment includes a playback device comprising a wireless network interface configured to connect to at least one data network, one or more processors, one or more non-transitory computer-readable media, and program instructions stored on the one or more non-transitory computer-readable media. The program instructions are executable by the one or more processors such that the playback device is configured to receive wireless signal data for first and second signals transmitted along each of a set of signal paths between several wireless playback devices transmitting on a wireless channel during synchronous playback of media content by the several wireless playback devices. The program instructions are further executable by the one or more processors such that the playback device is configured to, for each signal path of the set of signal paths, determine signal strengths based on the received wireless signal data for each of a set of portions of the wireless channel for each of the first and second signals, wherein a width of each portion of the set of portions is less than half of a width of the wireless channel, and calculate a difference, between the first and second signals, in the determined signal strengths for each portion of the set of portions. The program instructions are further executable by the one or more processors such that the playback device is configured to determine, based on the calculated differences for the set of portions for the set of signal paths, a state for a set of individuals in a region between the several playback devices, and modify a state variable of a wireless playback device of the several wireless playback devices to modify the synchronous playback based on the determined state.

One embodiment includes a playback device comprising a wireless network interface configured to connect to at least one data network, one or more processors, one or more non-transitory computer-readable media, and program instructions stored on the one or more non-transitory computer-readable media. The program instructions are executable by the one or more processors such that the playback device is configured to receive wireless signal strength data for signals transmitted along signal paths between several wireless playback devices transmitting on a wireless channel during synchronous playback of media content by the several wireless playback devices, and determine a first signal strength for each of a plurality of portions of the wireless channel. The program instructions are further executable by the one or more processors such that the playback device is configured to, for each signal path between each of the plurality of wireless playback devices, calculate a difference in the determined first signal strength from a second signal strength for each of the plurality of subcarriers. The program instructions are further executable by the one or more processors such that the playback device is configured to detect, based on the calculated differences, at least one gesture performed by a set of one or more individuals in the region.

Additional embodiments and features are set forth in part in the description that follows, and in part will become apparent to those skilled in the art upon examination of the specification or may be learned by the practice of the technology described herein. A further understanding of the nature and advantages of the technology described herein may be realized by reference to the remaining portions of the specification and the drawings, which forms a part of this disclosure.

BRIEF DESCRIPTION OF THE DRAWINGS

Features, aspects, and advantages of the presently disclosed technology may be better understood with regard to the following description, appended claims, and accompanying drawings.

FIGS. 3A-3E are diagrams showing example playback device configurations in accordance with aspects of the disclosure.

FIG. 4A is a functional block diagram of an example controller device in accordance with aspects of the disclosure.

FIGS. 4B and 4C are controller interfaces in accordance with aspects of the disclosure.

Figure 1A:
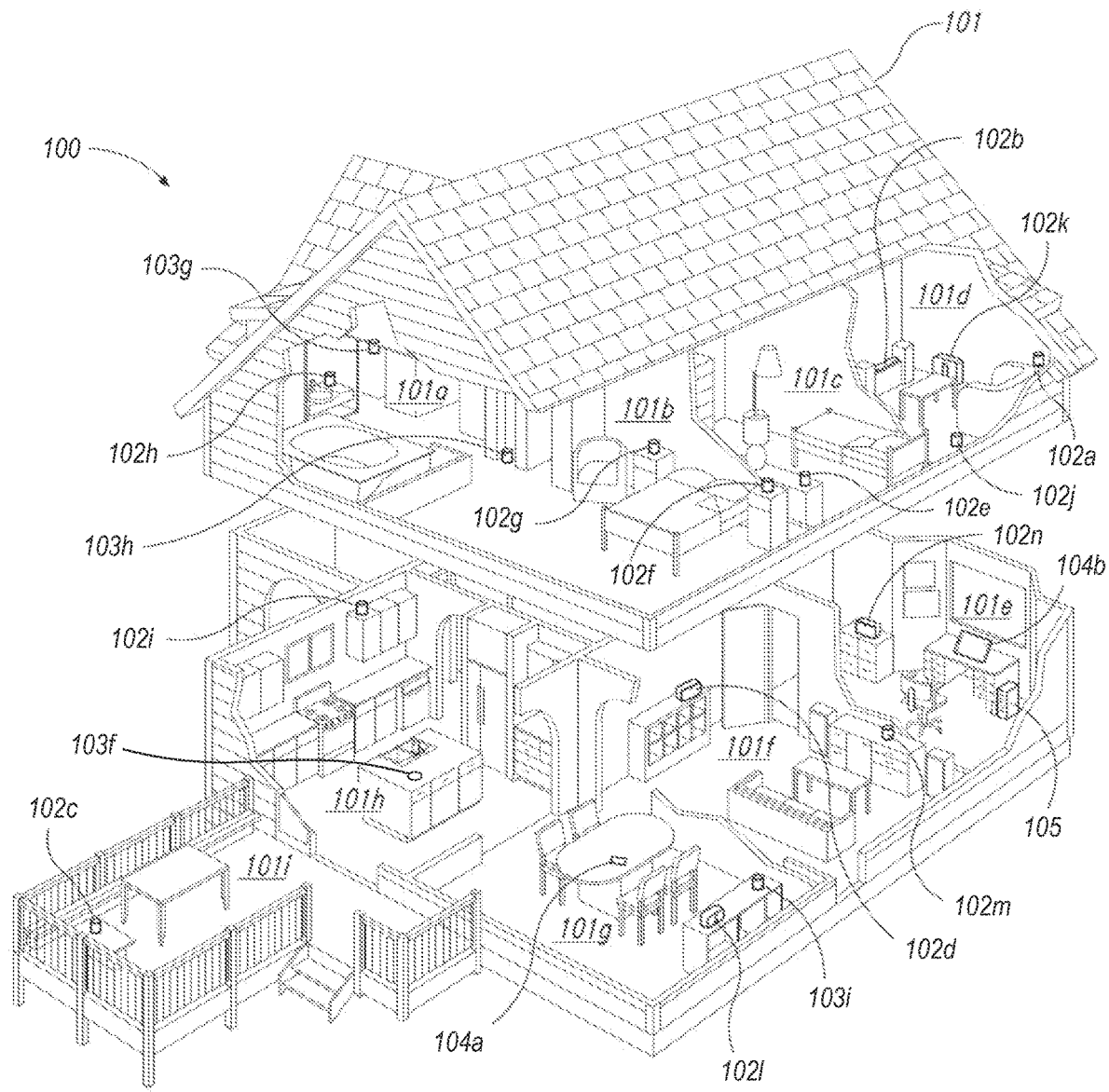
FIG. 1A is a partial cutaway view of an environment having a media playback system configured in accordance with aspects of the disclosed technology.

The drawings are for purposes of illustrating example embodiments, but it should be understood that the inventions are not limited to the arrangements and instrumentality shown in the drawings. In the drawings, identical reference numbers identify at least generally similar elements. To facilitate the discussion of any particular element, the most significant digit or digits of any reference number refers to the Figure in which that element is first introduced. For example, element 103a is first introduced and discussed with reference to FIG. 1A.

DETAILED DESCRIPTION

I. Overview

Systems and methods in accordance with numerous embodiments can localize individuals in a region between wireless devices based on signal strengths of portions of a wireless channel. Most conventional wireless-based location determination techniques rely on standard RSSI measurements associated with packet transmissions in a given wireless channel. One problem with such a conventional approach is that the wireless channel can be quite wide (e.g., 13+ MHz wide). As a result, the signal strength measurements are very coarse because they are describing the signal energy across that entire channel. As different frequencies can be affected in different ways, the coarse measurement of the signal strength across the channel can be noisy, obscuring potentially valuable signal strength information.

Accordingly, aspects of the present disclosure relate to new techniques for using signal strength measurements of portions of a wireless channel to evaluate signals between wireless devices. Instead of attempting to determine location based on standard RSSI measurements, processes in accordance with various embodiments can instead use more granular information indicative of a state of the wireless channel (e.g., channel state information). Examples of such channel state information include signal strength indicators for at least some (if not all of) the portions (e.g., subcarriers) within that wireless channel. The structure of subcarriers varies based on, among other things, the particular standard employed for wireless communication. In the 802.11ac standard, a 20 MHz wide channel may have 56 total subcarriers with a width of 312.5 kHz. In the 802.11ax standard, a 20 MHz wide channel may have 256 subcarriers with a width of 78.125 KHz. The variation in signal strength when a human walks between a line-of-sight path of two wireless radios can be much more pronounced when looking at changes in signal strength at the subcarrier level instead of at the channel level. Thus, by measuring signal strengths at a subcarrier level instead of a channel level, processes can more accurately and consistently detect the presence (or absence) of people in a region.

In many embodiments, new experiences can be enabled and customized based on some indication of where a user is located relative to different devices (e.g., playback devices in a given area such as a home theater system or a stereo pair configuration in a household). For example, systems and methods in accordance with many embodiments can adjust audio characteristics, or variables, (e.g., volume, balance, etc.) based on a user's location in the area between the playback devices such that the user is always in an acoustic sweet spot. In a number of embodiments, such features can be enabled without incorporating any additional hardware within the playback devices or the home theater system. Systems and methods in accordance with certain embodiments can leverage existing wireless radios in various devices to detect user location.

It should be appreciated that the techniques described herein may be employed to detect more than a location of a user relative to one or more devices. For example, such techniques may be employed to detect gestures performed by a user within a region (e.g., on a couch in a home theater setup). Examples of such gestures that may be detected using channel state information include: sitting down, standing up, walking, nodding head, shaking head, waving hand(s), and raising hand(s). Through detection of such gestures, systems in accordance with embodiments described here may advantageously provide an additional control mechanism through which a user may control one or more aspects of the system.

While some embodiments described herein may refer to functions performed by given actors, such as "users" and/or other entities, it should be understood that this description is for purposes of explanation only. The claims should not be interpreted to require action by any such example actor unless explicitly required by the language of the claims themselves.

II. Example Operating Environment

Figure 1B:
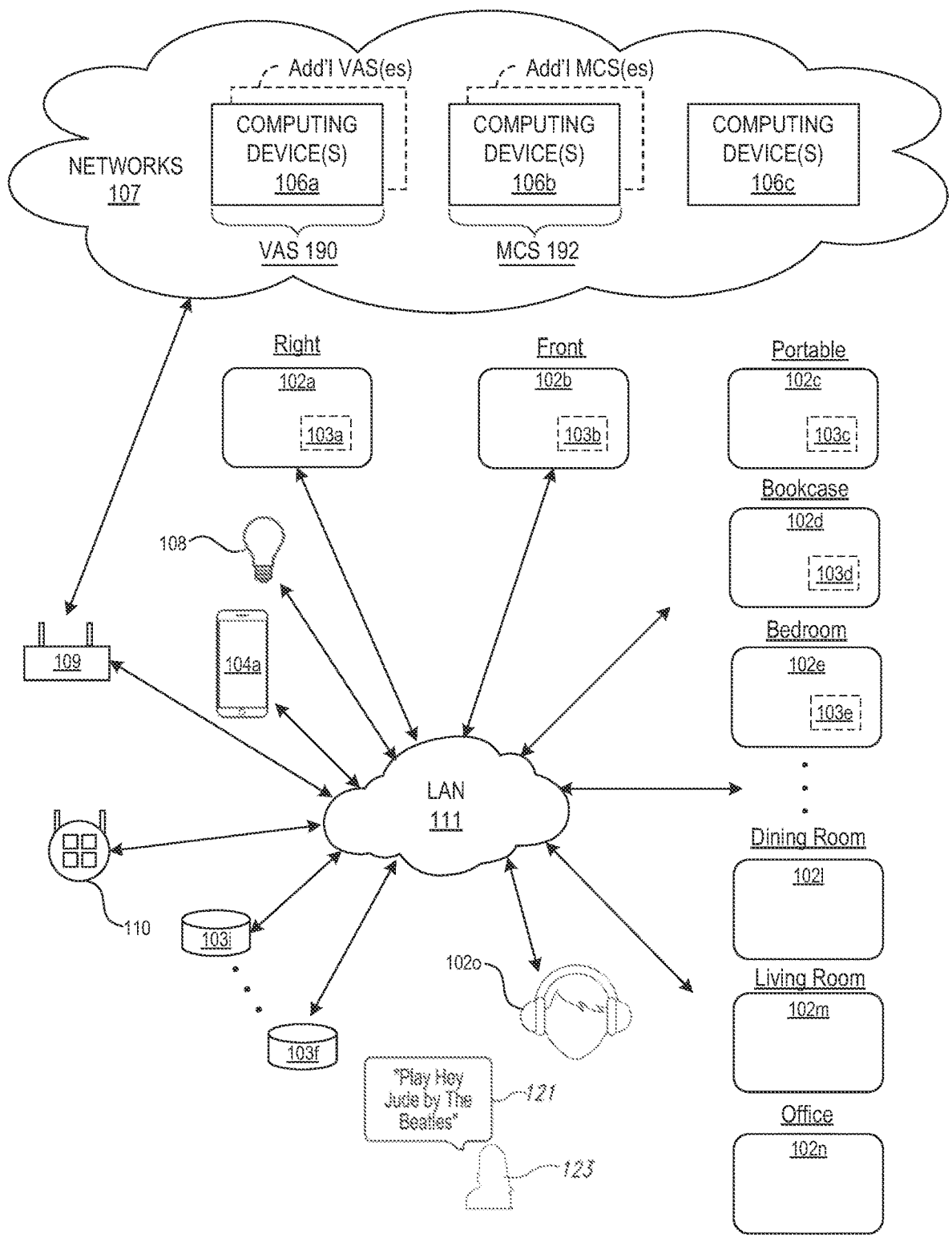
FIG. 1B is a schematic diagram of the media playback system of FIG. 1A and one or more networks.

FIGS. 1A and 1B illustrate an example configuration of a media playback system 100 (or "MPS 100") in which one or more embodiments disclosed herein may be implemented. Referring first to FIG. 1A, the MPS 100 as shown is associated with an example home environment having a plurality of rooms and spaces, which may be collectively referred to as a "home environment," "smart home," or "environment 101." The environment 101 comprises a household having several rooms, spaces, and/or playback zones, including a master bathroom 101a, a master bedroom 101b (referred to herein as "Nick's Room"), a second bedroom 101c, a family room or den 101d, an office 101e, a living room 101f, a dining room 101g, a kitchen 101h, and an outdoor patio 101i. While certain embodiments and examples are described below in the context of a home environment, the technologies described herein may be implemented in other types of environments. In some embodiments, for example, the MPS 100 can be implemented in one or more commercial settings (e.g., a restaurant, mall, airport, hotel, a retail or other store), one or more vehicles (e.g., a sports utility vehicle, bus, car, a ship, a boat, an airplane), multiple environments (e.g., a combination of home and vehicle environments), and/or another suitable environment where multi-zone audio may be desirable.

Within these rooms and spaces, the MPS 100 includes one or more computing devices. Referring to FIGS. 1A and 1B together, such computing devices can include playback devices 102 (identified individually as playback devices 102a-102o), network microphone devices 103 (identified individually as "NMDs" 103a-102i), and controller devices 104a and 104b (collectively "controller devices 104"). Referring to FIG. 1B, the home environment may include additional and/or other computing devices, including local network devices, such as one or more smart illumination devices 108 (FIG. 1B), a smart thermostat 110, and a local computing device 105 (FIG. 1A). In embodiments described below, one or more of the various playback devices 102 may be configured as portable playback devices, while others may be configured as stationary playback devices. For example, the headphones 102o (FIG. 1B) are a portable playback device, while the playback device 102d on the bookcase may be a stationary device. As another example, the playback device 102c on the Patio may be a battery-powered device, which may allow it to be transported to various areas within the environment 101, and outside of the environment 101, when it is not plugged in to a wall outlet or the like.

With reference still to FIG. 1B, the various playback, network microphone, and controller devices 102-104 and/or other network devices of the MPS 100 may be coupled to one another via point-to-point connections and/or over other connections, which may be wired and/or wireless, via a local network 111 that may include a network router 109. For example, the playback device 102j in the Den 101d (FIG. 1A), which may be designated as the "Left" device, may have a point-to-point connection with the playback device 102a, which is also in the Den 101d and may be designated as the "Right" device. In a related embodiment, the Left playback device 102j may communicate with other network devices, such as the playback device 102b, which may be designated as the "Front" device, via a point-to-point connection and/or other connections via the local network 111. The local network 111 may be, for example, a network that interconnects one or more devices within a limited area (e.g., a residence, an office building, a car, an individual's workspace, etc.). The local network 111 may include, for example, one or more local area network (LANs) such as wireless local area networks (WLANs) (e.g., WI-FI networks, Z-WAVE networks, etc.) and/or one or more personal area networks (PANs) such as BLUETOOTH networks, wireless USB networks, ZIGBEE networks, and IRDA networks.

As further shown in FIG. 1B, the MPS 100 may be coupled to one or more remote computing devices 106 via a wide area network ("WAN") 107. In some embodiments, each remote computing device 106 may take the form of one or more cloud servers. The remote computing devices 106 may be configured to interact with computing devices in the environment 101 in various ways. For example, the remote computing devices 106 may be configured to facilitate streaming and/or controlling playback of media content, such as audio, in the home environment 101.

In some implementations, the various playback devices, NMDs, and/or controller devices 102-104 may be communicatively coupled to at least one remote computing device associated with a voice assistant service ("VAS") and at least one remote computing device associated with a media content service ("MCS"). For instance, in the illustrated example of FIG. 1B, remote computing devices 106a are associated with a VAS 190 and remote computing devices 106b are associated with an MCS 192. Although only a single VAS 190 and a single MCS 192 are shown in the example of FIG. 1B for purposes of clarity, the MPS 100 may be coupled to multiple, different VASes and/or MCSes.

In some implementations, VASes may be operated by one or more of AMAZON, GOOGLE, APPLE, MICROSOFT, NUANCE, SONOS or other voice assistant providers. In some implementations, MCSes may be operated by one or more of SPOTIFY, PANDORA, AMAZON MUSIC, or other media content services.

As further shown in FIG. 1B, the remote computing devices 106 further include remote computing device 106c configured to perform certain operations, such as remotely facilitating media playback functions, managing device and system status information, directing communications between the devices of the MPS 100 and one or multiple VASes and/or MCSes, among other operations. In one example, the remote computing devices 106c provide cloud servers for one or more SONOS Wireless HiFi Systems.

In various implementations, one or more of the playback devices 102 may take the form of or include an on-board (e.g., integrated) network microphone device. For example, the playback devices 102a-e include or are otherwise equipped with corresponding NMDs 103a-e, respectively. A playback device that includes or is equipped with an NMD may be referred to herein interchangeably as a playback device or an NMD unless indicated otherwise in the description. In some cases, one or more of the NMDs 103 may be a stand-alone device. For example, the NMDs 103f and 103g may be stand-alone devices. A stand-alone NMD may omit components and/or functionality that is typically included in a playback device, such as a speaker or related electronics. For instance, in such cases, a stand-alone NMD may not produce audio output or may produce limited audio output (e.g., relatively low-quality audio output).

The various playback and network microphone devices 102 and 103 of the MPS 100 may each be associated with a unique name, which may be assigned to the respective devices by a user, such as during setup of one or more of these devices. For instance, as shown in the illustrated example of FIG. 1B, a user may assign the name "Bookcase" to playback device 102d because it is physically situated on a bookcase. Similarly, the NMD 103f may be assigned the named "Island" because it is physically situated on an island countertop in the Kitchen 101h (FIG. 1A). Some playback devices may be assigned names according to a zone or room, such as the playback devices 102e, 102l, 102m, and 102n, which are named "Bedroom," "Dining Room," "Living Room," and "Office," respectively. Further, certain playback devices may have functionally descriptive names. For example, the playback devices 102a and 102b are assigned the names "Right" and "Front," respectively, because these two devices are configured to provide specific audio channels during media playback in the zone of the Den 101d (FIG. 1A). The playback device 102c in the Patio may be named portable because it is battery-powered and/or readily transportable to different areas of the environment 101. Other naming conventions are possible.

As discussed above, an NMD may detect and process sound from its environment, such as sound that includes background noise mixed with speech spoken by a person in the NMD's vicinity. For example, as sounds are detected by the NMD in the environment, the NMD may process the detected sound to determine if the sound includes speech that contains voice input intended for the NMD and ultimately a particular VAS. For example, the NMD may identify whether speech includes a wake word associated with a particular VAS.

In the illustrated example of FIG. 1B, the NMDs 103 are configured to interact with the VAS 190 over the local network 111 and/or the router 109. Interactions with the VAS 190 may be initiated, for example, when an NMD identifies in the detected sound a potential wake word. The identification causes a wake-word event, which in turn causes the NMD to begin transmitting detected-sound data to the VAS 190. In some implementations, the various local network devices 102-105 (FIG. 1A) and/or remote computing devices 106c of the MPS 100 may exchange various feedback, information, instructions, and/or related data with the remote computing devices associated with the selected VAS. Such exchanges may be related to or independent of transmitted messages containing voice inputs. In some embodiments, the remote computing device(s) and the media playback system 100 may exchange data via communication paths as described herein and/or using a metadata exchange channel as described in U.S. Patent Publication No. 2017-0242653 published Aug. 24, 2017, and titled "Voice Control of a Media Playback System," which is herein incorporated by reference in its entirety.

Upon receiving the stream of sound data, the VAS 190 determines if there is voice input in the streamed data from the NMD, and if so the VAS 190 will also determine an underlying intent in the voice input. The VAS 190 may next transmit a response back to the MPS 100, which can include transmitting the response directly to the NMD that caused the wake-word event. The response is typically based on the intent that the VAS 190 determined was present in the voice input. As an example, in response to the VAS 190 receiving a voice input with an utterance to "Play Hey Jude by The Beatles," the VAS 190 may determine that the underlying intent of the voice input is to initiate playback and further determine that intent of the voice input is to play the particular song "Hey Jude." After these determinations, the VAS 190 may transmit a command to a particular MCS 192 to retrieve content (i.e., the song "Hey Jude"), and that MCS 192, in turn, provides (e.g., streams) this content directly to the MPS 100 or indirectly via the VAS 190. In some implementations, the VAS 190 may transmit to the MPS 100 a command that causes the MPS 100 itself to retrieve the content from the MCS 192.

In certain implementations, NMDs may facilitate arbitration amongst one another when voice input is identified in speech detected by two or more NMDs located within proximity of one another. For example, the NMD-equipped playback device 102d in the environment 101 (FIG. 1A) is in relatively close proximity to the NMD-equipped Living Room playback device 102m, and both devices 102d and 102m may at least sometimes detect the same sound. In such cases, this may require arbitration as to which device is ultimately responsible for providing detected-sound data to the remote VAS. Examples of arbitrating between NMDs may be found, for example, in previously referenced U.S. Patent Publication No. 2017-0242653.

In certain implementations, an NMD may be assigned to, or otherwise associated with, a designated or default playback device that may not include an NMD. For example, the Island NMD 103f in the Kitchen 101h (FIG. 1A) may be assigned to the Dining Room playback device 102l, which is in relatively close proximity to the Island NMD 103f. In practice, an NMD may direct an assigned playback device to play audio in response to a remote VAS receiving a voice input from the NMD to play the audio, which the NMD might have sent to the VAS in response to a user speaking a command to play a certain song, album, playlist, etc. Additional details regarding assigning NMDs and playback devices as designated or default devices may be found, for example, in previously referenced U.S. Patent Publication No. 2017-0242653.

Further aspects relating to the different components of the example MPS 100 and how the different components may interact to provide a user with a media experience may be found in the following sections. While discussions herein may generally refer to the example MPS 100, technologies described herein are not limited to applications within, among other things, the home environment described above. For instance, the technologies described herein may be useful in other home environment configurations comprising more or fewer of any of the playback, network microphone, and/or controller devices 102-104. For example, the technologies herein may be utilized within an environment having a single playback device 102 and/or a single NMD 103. In some examples of such cases, the local network 111 (FIG. 1B) may be eliminated and the single playback device 102 and/or the single NMD 103 may communicate directly with the remote computing devices 106a-d. In some embodiments, a telecommunication network (e.g., an LTE network, a 5G network, etc.) may communicate with the various playback, network microphone, and/or controller devices 102-104 independent of the local network 111.

While specific implementations of MPS's have been described above with respect to FIGS. 1A and 1B, there are numerous configurations of MPS's, including, but not limited to, those that do not interact with remote services, systems that do not include controllers, and/or any other configuration as appropriate to the requirements of a given application.

a. Example Playback & Network Microphone Devices

Figure 2A:
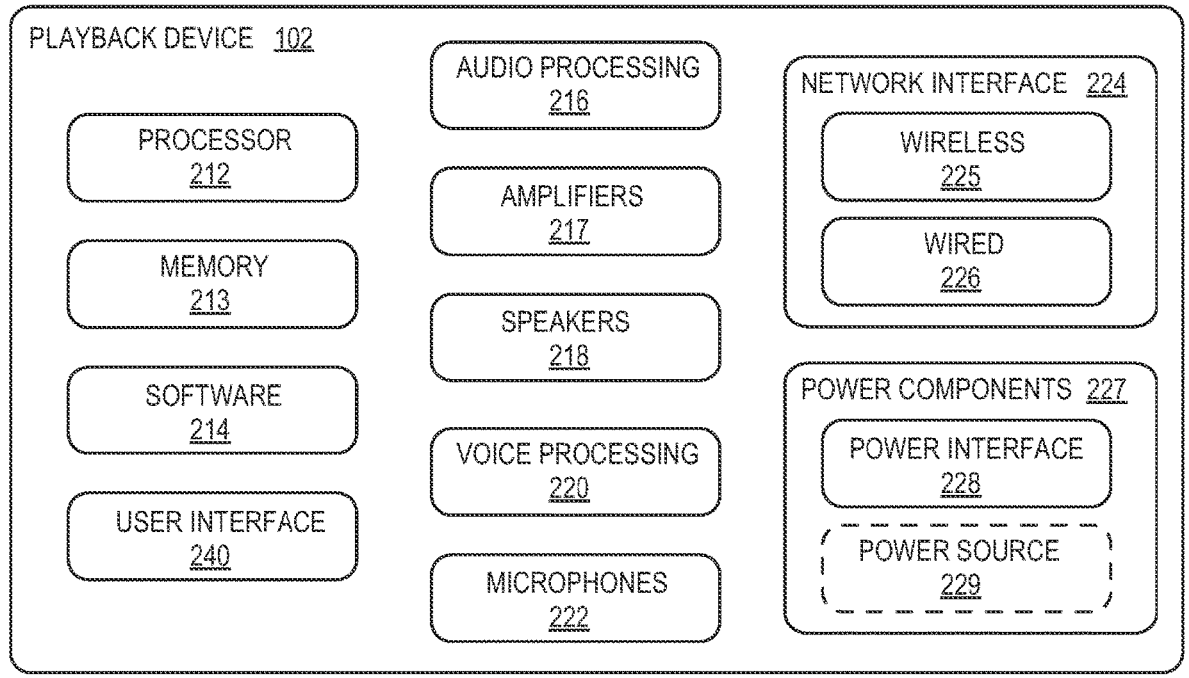
FIG. 2A is a functional block diagram of an example playback device.

FIG. 2A is a functional block diagram illustrating certain aspects of one of the playback devices 102 of the MPS 100 of FIGS. 1A and 1B. As shown, the playback device 102 includes various components, each of which is discussed in further detail below, and the various components of the playback device 102 may be operably coupled to one another via a system bus, communication network, or some other connection mechanism. In the illustrated example of FIG. 2A, the playback device 102 may be referred to as an "NMD-equipped" playback device because it includes components that support the functionality of an NMD, such as one of the NMDs 103 shown in FIG. 1A.

As shown, the playback device 102 includes at least one processor 212, which may be a clock-driven computing component configured to process input data according to instructions stored in memory 213. The memory 213 may be a tangible, non-transitory, computer-readable medium configured to store instructions that are executable by the processor 212. For example, the memory 213 may be data storage that can be loaded with software code 214 that is executable by the processor 212 to achieve certain functions.

In one example, these functions may involve the playback device 102 retrieving audio data from an audio source, which may be another playback device. In another example, the functions may involve the playback device 102 sending audio data, detected-sound data (e.g., corresponding to a voice input), and/or other information to another device on a network via at least one network interface 224. In yet another example, the functions may involve the playback device 102 causing one or more other playback devices to synchronously playback audio with the playback device 102. In yet a further example, the functions may involve the playback device 102 facilitating being paired or otherwise bonded with one or more other playback devices to create a multi-channel audio environment. Numerous other example functions are possible, some of which are discussed below.

As just mentioned, certain functions may involve the playback device 102 synchronizing playback of audio content with one or more other playback devices. During synchronous playback, a listener may not perceive time-delay differences between playback of the audio content by the synchronized playback devices. U.S. Pat. No. 8,234,395 filed on Apr. 4, 2004, and titled "System and method for synchronizing operations among a plurality of independently clocked digital data processing devices," which is hereby incorporated by reference in its entirety, provides in more detail some examples for audio playback synchronization among playback devices.

To facilitate audio playback, the playback device 102 includes audio processing components 216 that are generally configured to process audio prior to the playback device 102 rendering the audio. In this respect, the audio processing components 216 may include one or more digital-to-analog converters ("DAC"), one or more audio preprocessing components, one or more audio enhancement components, one or more digital signal processors ("DSPs"), and so on. In some implementations, one or more of the audio processing components 216 may be a subcomponent of the processor 212. In operation, the audio processing components 216 receive analog and/or digital audio and process and/or otherwise intentionally alter the audio to produce audio signals for playback.

The produced audio signals may then be provided to one or more audio amplifiers 217 for amplification and playback through one or more speakers 218 operably coupled to the amplifiers 217. The audio amplifiers 217 may include components configured to amplify audio signals to a level for driving one or more of the speakers 218.

Each of the speakers 218 may include an individual transducer (e.g., a "driver") or the speakers 218 may include a complete speaker system involving an enclosure with one or more drivers. A particular driver of a speaker 218 may include, for example, a subwoofer (e.g., for low frequencies), a mid-range driver (e.g., for middle frequencies), and/or a tweeter (e.g., for high frequencies). In some cases, a transducer may be driven by an individual corresponding audio amplifier of the audio amplifiers 217. In some implementations, a playback device may not include the speakers 218, but instead may include a speaker interface for connecting the playback device to external speakers. In certain embodiments, a playback device may include neither the speakers 218 nor the audio amplifiers 217, but instead may include an audio interface (not shown) for connecting the playback device to an external audio amplifier or audio-visual receiver.

In addition to producing audio signals for playback by the playback device 102, the audio processing components 216 may be configured to process audio to be sent to one or more other playback devices, via the network interface 224, for playback. In example scenarios, audio content to be processed and/or played back by the playback device 102 may be received from an external source, such as via an audio line-in interface (e.g., an auto-detecting 3.5 mm audio line-in connection) of the playback device 102 (not shown) or via the network interface 224, as described below.

As shown, the at least one network interface 224, may take the form of one or more wireless interfaces 225 and/or one or more wired interfaces 226. A wireless interface may provide network interface functions for the playback device 102 to wirelessly communicate with other devices (e.g., other playback device(s), NMD(s), and/or controller device(s)) in accordance with a communication protocol (e.g., any wireless standard including IEEE 802.11a, 802.11b, 802.11g, 802.11n, 802.11ac, 802.11ad, 802.11af, 802.11ah, 802.11ai, 802.11aj, 802.11aq, 802.11ax, 802.11 ay, 802.15, BLUETOOTH, 4G mobile communication standard, 5G mobile communication standard, and so on). A wired interface may provide network interface functions for the playback device 102 to communicate over a wired connection with other devices in accordance with a communication protocol (e.g., IEEE 802.3). While the network interface 224 shown in FIG. 2A includes both wired and wireless interfaces, the playback device 102 may in some implementations include only wireless interface(s) or only wired interface(s).

In general, the network interface 224 facilitates data flow between the playback device 102 and one or more other devices on a data network. For instance, the playback device 102 may be configured to receive audio content over the data network from one or more other playback devices, network devices within a LAN, and/or audio content sources over a WAN, such as the Internet. In one example, the audio content and other signals transmitted and received by the playback device 102 may be transmitted in the form of digital packet data comprising an Internet Protocol (IP)-based source address and IP-based destination addresses. In such a case, the network interface 224 may be configured to parse the digital packet data such that the data destined for the playback device 102 is properly received and processed by the playback device 102.

As shown in FIG. 2A, the playback device 102 also includes voice processing components 220 that are operably coupled to one or more microphones 222. The microphones 222 are configured to detect sound (i.e., acoustic waves) in the environment of the playback device 102, which is then provided to the voice processing components 220. More specifically, each microphone 222 is configured to detect sound and convert the sound into a digital or analog signal representative of the detected sound, which can then cause the voice processing component 220 to perform various functions based on the detected sound, as described in greater detail below. In one implementation, the microphones 222 are arranged as an array of microphones (e.g., an array of six microphones). In some implementations, the playback device 102 includes more than six microphones (e.g., eight microphones or twelve microphones) or fewer than six microphones (e.g., four microphones, two microphones, or a single microphones).

In operation, the voice-processing components 220 are generally configured to detect and process sound received via the microphones 222, identify potential voice input in the detected sound, and extract detected-sound data to enable a VAS, such as the VAS 190 (FIG. 1B), to process voice input identified in the detected-sound data. The voice processing components 220 may include one or more analog-to-digital converters, an acoustic echo canceller ("AEC"), a spatial processor (e.g., one or more multi-channel Wiener filters, one or more other filters, and/or one or more beam former components), one or more buffers (e.g., one or more circular buffers), one or more wake-word engines, one or more voice extractors, and/or one or more speech processing components (e.g., components configured to recognize a voice of a particular user or a particular set of users associated with a household), among other example voice processing components. In example implementations, the voice processing components 220 may include or otherwise take the form of one or more DSPs or one or more modules of a DSP. In this respect, certain voice processing components 220 may be configured with particular parameters (e.g., gain and/or spectral parameters) that may be modified or otherwise tuned to achieve particular functions. In some implementations, one or more of the voice processing components 220 may be a subcomponent of the processor 212.

In some implementations, the voice-processing components 220 may detect and store a user's voice profile, which may be associated with a user account of the MPS 100. For example, voice profiles may be stored as and/or compared to variables stored in a set of command information or data table. The voice profile may include aspects of the tone or frequency of a user's voice and/or other unique aspects of the user's voice, such as those described in previously-referenced U.S. Patent Publication No. 2017-0242653.

As further shown in FIG. 2A, the playback device 102 also includes power components 227. The power components 227 may include at least an external power source interface 228, which may be coupled to a power source (not shown) via a power cable or the like that physically connects the playback device 102 to an electrical outlet or some other external power source. Other power components may include, for example, transformers, converters, and like components configured to format electrical power.

In some implementations, the power components 227 of the playback device 102 may additionally include an internal power source 229 (e.g., one or more batteries) configured to power the playback device 102 without a physical connection to an external power source. When equipped with the internal power source 229, the playback device 102 may operate independent of an external power source. In some such implementations, the external power source interface 228 may be configured to facilitate charging the internal power source 229. As discussed before, a playback device comprising an internal power source may be referred to herein as a "portable playback device." Those portable playback devices that weigh no more than fifty ounces (e.g., between three ounces and fifty ounces, between five ounces and fifty ounces, between ten ounces and fifty ounces, between ten ounces and twenty-five ounces, etc.) may be referred to herein as an "ultra-portable playback device." Those playback devices that operate using an external power source instead of an internal power source may be referred to herein as a "stationary playback device," although such a device may in fact be moved around a home or other environment.

The playback device 102 may further include a user interface 240 that may facilitate user interactions independent of or in conjunction with user interactions facilitated by one or more of the controller devices 104. In various embodiments, the user interface 240 includes one or more physical buttons and/or supports graphical interfaces provided on touch sensitive screen(s) and/or surface(s), among other possibilities, for a user to directly provide input. The user interface 240 may further include one or more of lights (e.g., LEDs) and the speakers to provide visual and/or audio feedback to a user.

Figure 2B:
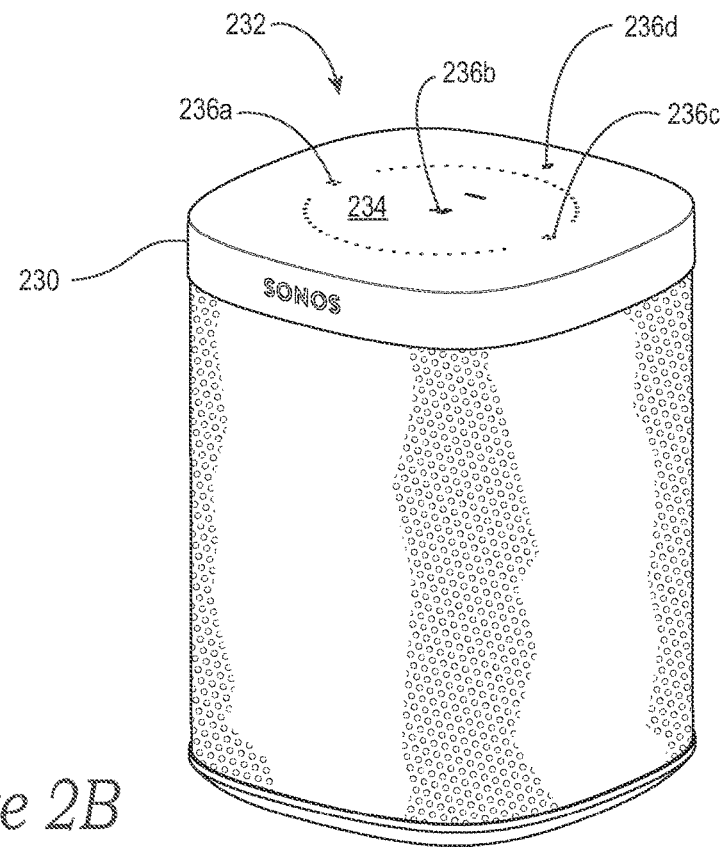
FIG. 2B is an isometric diagram of an example housing of the playback device of FIG. 2A.

As an illustrative example, FIG. 2B shows an example housing 230 of the playback device 102 that includes a user interface in the form of a control area 232 at a top portion 234 of the housing 230. The control area 232 includes buttons 236a-c for controlling audio playback, volume level, and other functions. The control area 232 also includes a button 236d for toggling the microphones 222 to either an on state or an off state.

As further shown in FIG. 2B, the control area 232 is at least partially surrounded by apertures formed in the top portion 234 of the housing 230 through which the microphones 222 (not visible in FIG. 2B) receive the sound in the environment of the playback device 102. The microphones 222 may be arranged in various positions along and/or within the top portion 234 or other areas of the housing 230 so as to detect sound from one or more directions relative to the playback device 102.

Figure 2C:
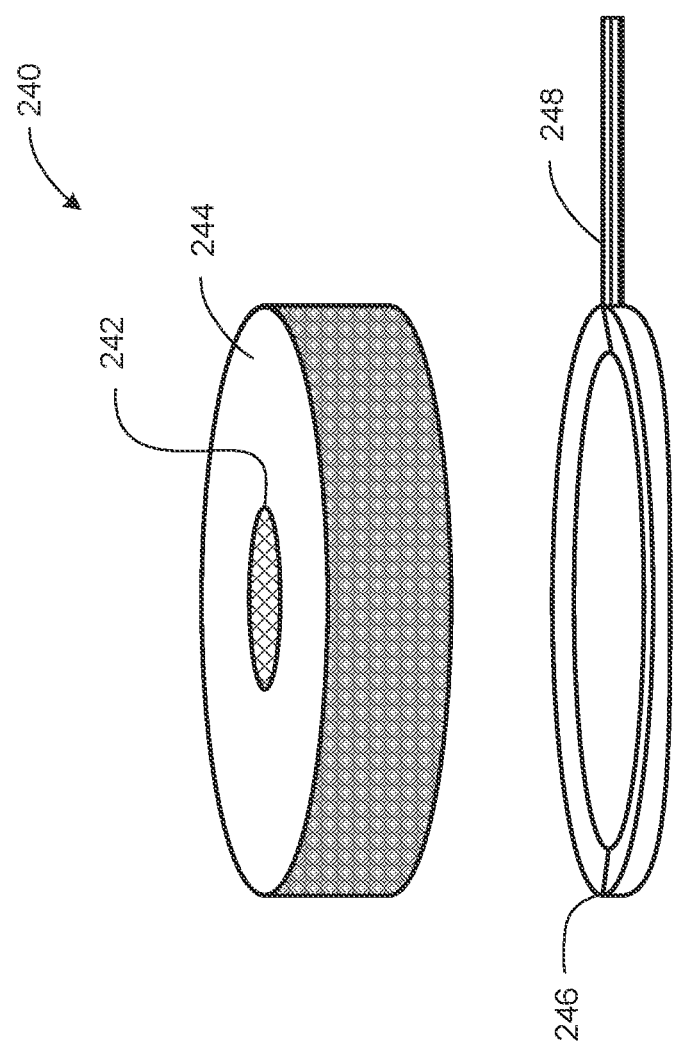
FIG. 2C is a diagram of another example housing for the playback device of FIG. 2A.

As mentioned above, the playback device 102 may be constructed as a portable playback device, such as an ultra-portable playback device, that comprises an internal power source. FIG. 2C shows an example housing 240 for such a portable playback device. As shown, the housing 240 of the portable playback device includes a user interface in the form of a control area 242 at a top portion 244 of the housing 240. The control area 242 may include a capacitive touch sensor for controlling audio playback, volume level, and other functions. The housing 240 of the portable playback device may be configured to engage with a dock 246 that is connected to an external power source via cable 248. The dock 246 may be configured to provide power to the portable playback device to recharge an internal battery. In some embodiments, the dock 246 may comprise a set of one or more conductive contacts (not shown) positioned on the top of the docket 246 that engage with conductive contacts on the bottom of the housing 240 (not shown). In other embodiments, the dock 246 may provide power from the cable 248 to the portable playback device without the use of conductive contacts. For example, the dock 246 may wirelessly charge the portable playback device via one or more inductive coils integrated into each of the dock 246 and the portable playback device.

Figure 2D:
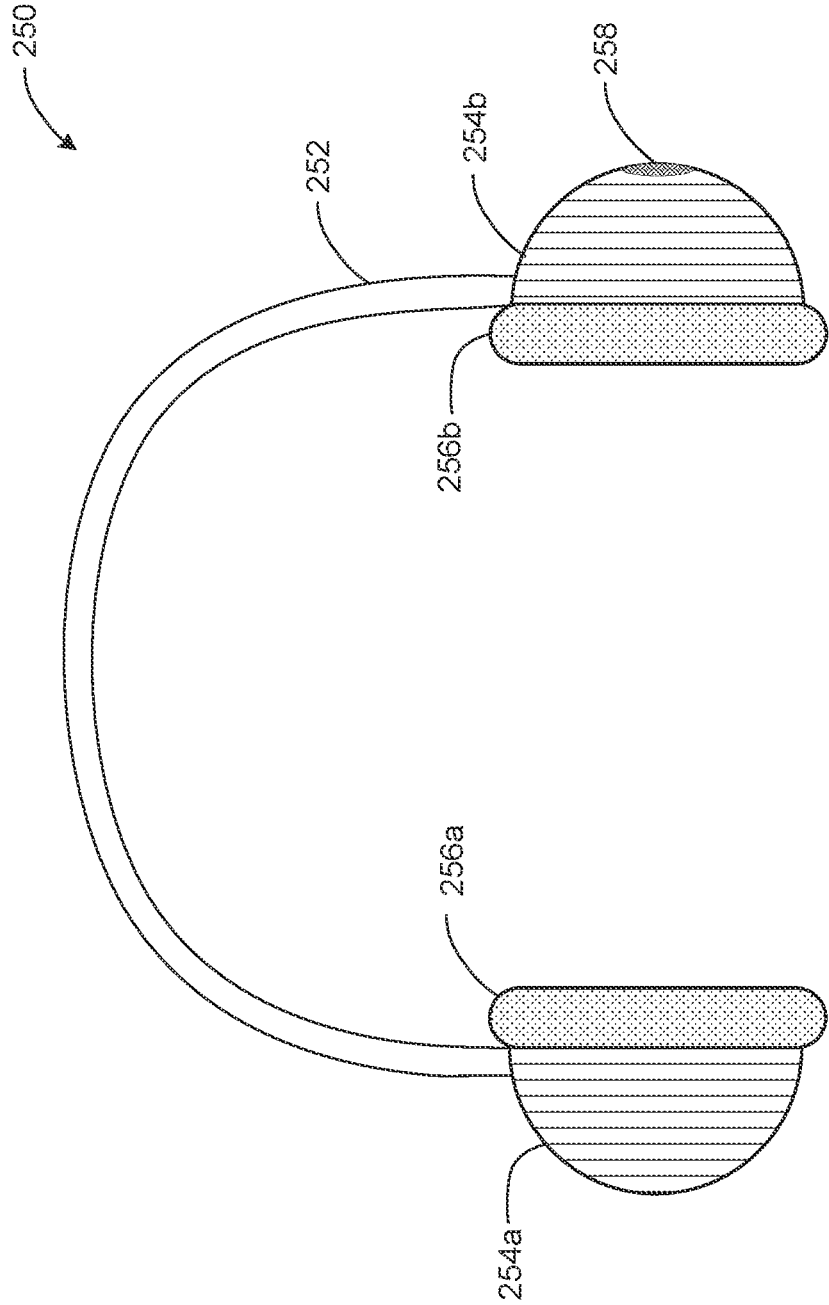
FIG. 2D is a diagram of another example housing for the playback device of FIG. 2A.

In some embodiments, the playback device 102 may take the form of a wired and/or wireless headphone (e.g., an over-ear headphone, an on-ear headphone, or an in-ear headphone). For instance, FIG. 2D shows an example housing 250 for such an implementation of the playback device 102. As shown, the housing 250 includes a headband 252 that couples a first earpiece 254a to a second earpiece 254b. Each of the earpieces 254a and 254b may house any portion of the electronic components in the playback device, such as one or more speakers. Further, one or more of the earpieces 254a and 254b may include a control area 258 for controlling audio playback, volume level, and other functions. The control area 258 may comprise any combination of the following: a capacitive touch sensor, a button, a switch, and a dial. As shown in FIG. 2D, the housing 250 may further include ear cushions 256a and 256b that are coupled to earpieces 254a and 254b, respectively. The ear cushions 256a and 256b may provide a soft barrier between the head of a user and the earpieces 254a and 254b, respectively, to improve user comfort and/or provide acoustic isolation from the ambient (e.g., passive noise reduction (PNR)). In some implementations, the wired and/or wireless headphones may be ultra-portable playback devices that are powered by an internal energy source and weigh less than fifty ounces.

It should be appreciated that the playback device 102 may take the form of other wearable devices separate and apart from a headphone. Wearable devices may include those devices configured to be worn about a portion of a subject (e.g., a head, a neck, a torso, an arm, a wrist, a finger, a leg, an ankle, etc.). For example, the playback device 102 may take the form of a pair of glasses including a frame front (e.g., configured to hold one or more lenses), a first temple rotatably coupled to the frame front, and a second temple rotatable coupled to the frame front. In this example, the pair of glasses may comprise one or more transducers integrated into at least one of the first and second temples and configured to project sound towards an ear of the subject.

While specific implementations of playback and network microphone devices have been described above with respect to FIGS. 2A, 2B, 2C, and 2D, there are numerous configurations of devices, including, but not limited to, those having no UI, microphones in different locations, multiple microphone arrays positioned in different arrangements, and/or any other configuration as appropriate to the requirements of a given application. For example, UIs and/or microphone arrays can be implemented in other playback devices and/or computing devices rather than those described herein. Further, although a specific example of playback device 102 is described with reference to MPS 100, one skilled in the art will recognize that playback devices as described herein can be used in a variety of different environments, including (but not limited to) environments with more and/or fewer elements, without departing from this invention. Likewise, MPS's as described herein can be used with various different playback devices.

By way of illustration, SONOS, Inc. presently offers (or has offered) for sale certain playback devices that may implement certain of the embodiments disclosed herein, including a "SONOS ONE," "PLAY:1," "PLAY:3," "PLAY:5," "PLAYBAR," "AMP," "CONNECT:AMP," "PLAYBASE," "BEAM," "CONNECT," and "SUB." Any other past, present, and/or future playback devices may additionally or alternatively be used to implement the playback devices of example embodiments disclosed herein. Additionally, it should be understood that a playback device is not limited to the examples illustrated in FIGS. 2A, 2B, 2C, or 2D or to the SONOS product offerings. For example, a playback device may be integral to another device or component such as a television, a lighting fixture, or some other device for indoor or outdoor use.

b. Example Playback Device Configurations

FIGS. 3A-3E show example configurations of playback devices. Referring first to FIG. 3A, in some example instances, a single playback device may belong to a zone. For example, the playback device 102c (FIG. 1A) on the Patio may belong to Zone A. In some implementations described below, multiple playback devices may be "bonded" to form a "bonded pair," which together form a single zone. For example, the playback device 102f (FIG. 1A) named "Bed 1" in FIG. 3A may be bonded to the playback device 102g (FIG. 1A) named "Bed 2" in FIG. 3A to form Zone B. Bonded playback devices may have different playback responsibilities (e.g., channel responsibilities). In another implementation described below, multiple playback devices may be merged to form a single zone. For example, the playback device 102d named "Bookcase" may be merged with the playback device 102m named "Living Room" to form a single Zone C. The merged playback devices 102d and 102m may not be specifically assigned different playback responsibilities. That is, the merged playback devices 102d and 102m may, aside from playing audio content in synchrony, each play audio content as they would if they were not merged.

For purposes of control, each zone in the MPS 100 may be represented as a single user interface ("UI") entity. For example, as displayed by the controller devices 104, Zone A may be provided as a single entity named "Portable," Zone B may be provided as a single entity named "Stereo," and Zone C may be provided as a single entity named "Living Room."

In various embodiments, a zone may take on the name of one of the playback devices belonging to the zone. For example, Zone C may take on the name of the Living Room device 102*m* (as shown). In another example, Zone C may instead take on the name of the Bookcase device 102*d*. In a further example, Zone C may take on a name that is some combination of the Bookcase device 102*d* and Living Room device 102*m*. The name that is chosen may be selected by a user via inputs at a controller device 104. In some embodiments, a zone may be given a name that is different than the device(s) belonging to the zone. For example, Zone B in FIG. 3A is named "Stereo" but none of the devices in Zone B have this name. In one aspect, Zone B is a single UI entity representing a single device named "Stereo," composed of constituent devices "Bed 1" and "Bed 2." In one implementation, the Bed 1 device may be playback device 102*f* in the master bedroom 101*h* (FIG. 1A) and the Bed 2 device may be the playback device 102*g* also in the master bedroom 101*h* (FIG. 1A).

As noted above, playback devices that are bonded may have different playback responsibilities, such as playback responsibilities for certain audio channels. For example, as shown in FIG. 3B, the Bed 1 and Bed 2 devices 102*f* and 102*g* may be bonded so as to produce or enhance a stereo effect of audio content. In this example, the Bed 1 playback device 102*f* may be configured to play a left channel audio component, while the Bed 2 playback device 102*g* may be configured to play a right channel audio component. In some implementations, such stereo bonding may be referred to as "pairing."

Additionally, playback devices that are configured to be bonded may have additional and/or different respective speaker drivers. As shown in FIG. 3C, the playback device 102*b* named "Front" may be bonded with the playback device 102*k* named "SUB." The Front device 102*b* may render a range of mid to high frequencies, and the SUB device 102*k* may render low frequencies as, for example, a subwoofer. When unbonded, the Front device 102*b* may be configured to render a full range of frequencies. As another example, FIG. 3D shows the Front and SUB devices 102*b* and 102*k* further bonded with Right and Left playback devices 102*a* and 102*j*, respectively. In some implementations, the Right and Left devices 102*a* and 102*j* may form surround or "satellite" channels of a home theater system. The bonded playback devices 102*a*, 102*b*, 102*j*, and 102*k* may form a single Zone D (FIG. 3A).

In some implementations, playback devices may also be "merged." In contrast to certain bonded playback devices, playback devices that are merged may not have assigned playback responsibilities, but may each render the full range of audio content that each respective playback device is capable of. Nevertheless, merged devices may be represented as a single UI entity (i.e., a zone, as discussed above). For instance, FIG. 3E shows the playback devices 102*d* and 102*m* in the Living Room merged, which would result in these devices being represented by the single UI entity of Zone C. In one embodiment, the playback devices 102*d* and 102*m* may playback audio in synchrony, during which each outputs the full range of audio content that each respective playback device 102*d* and 102*m* is capable of rendering.

In some embodiments, a stand-alone NMD may be in a zone by itself. For example, the NMD 103*h* from FIG. 1A is named "Closet" and forms Zone I in FIG. 3A. An NMD may also be bonded or merged with another device so as to form a zone. For example, the NMD device 103*f* named "Island" may be bonded with the playback device 102*i* Kitchen, which together form Zone F, which is also named "Kitchen." Additional details regarding assigning NMDs and playback devices as designated or default devices may be found, for example, in previously referenced U.S. Patent Publication No. 2017-0242653. In some embodiments, a stand-alone NMD may not be assigned to a zone.

Zones of individual, bonded, and/or merged devices may be arranged to form a set of playback devices that playback audio in synchrony. Such a set of playback devices may be referred to as a "group," "zone group," "synchrony group," or "playback group." In response to inputs provided via a controller device 104, playback devices may be dynamically grouped and ungrouped to form new or different groups that synchronously play back audio content. For example, referring to FIG. 3A, Zone A may be grouped with Zone B to form a zone group that includes the playback devices of the two zones. As another example, Zone A may be grouped with one or more other Zones C-I. The Zones A-I may be grouped and ungrouped in numerous ways. For example, three, four, five, or more (e.g., all) of the Zones A-I may be grouped. When grouped, the zones of individual and/or bonded playback devices may play back audio in synchrony with one another, as described in previously referenced U.S. Pat. No. 8,234,395. Grouped and bonded devices are example types of associations between portable and stationary playback devices that may be caused in response to a trigger event, as discussed above and described in greater detail below.

In various implementations, the zones in an environment may be assigned a particular name, which may be the default name of a zone within a zone group or a combination of the names of the zones within a zone group, such as "Dining Room +Kitchen," as shown in FIG. 3A. In some embodiments, a zone group may be given a unique name selected by a user, such as "Nick's Room," as also shown in FIG. 3A. The name "Nick's Room" may be a name chosen by a user over a prior name for the zone group, such as the room name "Master Bedroom."

Referring back to FIG. 2A, certain data may be stored in the memory 213 as one or more state variables that are periodically updated and used to describe the state of a playback zone, the playback device(s), and/or a zone group associated therewith. The memory 213 may also include the data associated with the state of the other devices of the media playback system 100, which may be shared from time to time among the devices so that one or more of the devices have the most recent data associated with the system.

In some embodiments, the memory 213 of the playback device 102 may store instances of various variable types associated with the states. Variables instances may be stored with identifiers (e.g., tags) corresponding to type. For example, certain identifiers may be a first type "a1" to identify playback device(s) of a zone, a second type "b1" to identify playback device(s) that may be bonded in the zone, and a third type "c1" to identify a zone group to which the zone may belong. As a related example, in FIG. 1A, identifiers associated with the Patio may indicate that the Patio is the only playback device of a particular zone and not in a zone group. Identifiers associated with the Living Room may indicate that the Living Room is not grouped with other zones but includes bonded playback devices 102*a*, 102*b*, 102*j*, and 102*k*. Identifiers associated with the Dining Room may indicate that the Dining Room is part of Dining Room+Kitchen group and that devices 103*f* and 102*i* are bonded. Identifiers associated with the Kitchen may indicate the same or similar information by virtue of the Kitchen being part of the Dining Room+Kitchen zone group. Other example zone variables and identifiers are described below.

In yet another example, the MPS 100 may include variables or identifiers representing other associations of zones and zone groups, such as identifiers associated with Areas, as shown in FIG. 3A. An Area may involve a cluster of zone groups and/or zones not within a zone group. For instance, FIG. 3A shows a first area named "First Area" and a second area named "Second Area." The First Area includes zones and zone groups of the Patio, Den, Dining Room, Kitchen, and Bathroom. The Second Area includes zones and zone groups of the Bathroom, Nick's Room, Bedroom, and Living Room. In one aspect, an Area may be used to invoke a cluster of zone groups and/or zones that share one or more zones and/or zone groups of another cluster. In this respect, such an Area differs from a zone group, which does not share a zone with another zone group. Further examples of techniques for implementing Areas may be found, for example, in U.S. Patent Publication No. 2018-0107446 published Apr. 19, 2018 and titled "Room Association Based on Name," and U.S. Pat. No. 8,483,853 filed Sep. 11, 2007, and titled "Controlling and manipulating groupings in a multi-zone media system," each of which is incorporated herein by reference in its entirety. In some embodiments, the MPS 100 may not implement Areas, in which case the system may not store variables associated with Areas.

The memory 213 may be further configured to store other data. Such data may pertain to audio sources accessible by the playback device 102 or a playback queue that the playback device (or some other playback device(s)) may be associated with. In embodiments described below, the memory 213 is configured to store a set of command data for selecting a particular VAS when processing voice inputs.

During operation, one or more playback zones in the environment of FIG. 1A may each be playing different audio content. For instance, the user may be grilling in the Patio zone and listening to hip hop music being played by the playback device 102c, while another user may be preparing food in the Kitchen zone and listening to classical music being played by the playback device 102i. In another example, a playback zone may play the same audio content in synchrony with another playback zone. For instance, the user may be in the Office zone where the playback device 102n is playing the same hip-hop music that is being playing by playback device 102c in the Patio zone. In such a case, playback devices 102c and 102n may be playing the hip-hop in synchrony such that the user may seamlessly (or at least substantially seamlessly) enjoy the audio content that is being played out-loud while moving between different playback zones. Synchronization among playback zones may be achieved in a manner similar to that of synchronization among playback devices, as described in previously referenced U.S. Pat. No. 8,234,395.

As suggested above, the zone configurations of the MPS 100 may be dynamically modified. As such, the MPS 100 may support numerous configurations. For example, if a user physically moves one or more playback devices to or from a zone, the MPS 100 may be reconfigured to accommodate the change(s). For instance, if the user physically moves the playback device 102c from the Patio zone to the Office zone, the Office zone may now include both the playback devices 102c and 102n. In some cases, the user may pair or group the moved playback device 102c with the Office zone and/or rename the players in the Office zone using, for example, one of the controller devices 104 and/or voice input. As another example, if one or more playback devices 102 are moved to a particular space in the home environment that is not already a playback zone, the moved playback device(s) may be renamed or associated with a playback zone for the particular space.

Further, different playback zones of the MPS 100 may be dynamically combined into zone groups or split up into individual playback zones. For example, the Dining Room zone and the Kitchen zone may be combined into a zone group for a dinner party such that playback devices 102i and 102l may render audio content in synchrony. As another example, bonded playback devices in the Den zone may be split into (i) a television zone and (ii) a separate listening zone. The television zone may include the Front playback device 102b. The listening zone may include the Right, Left, and SUB playback devices 102a, 102j, and 102k, which may be grouped, paired, or merged, as described above. Splitting the Den zone in such a manner may allow one user to listen to music in the listening zone in one area of the living room space, and another user to watch the television in another area of the living room space. In a related example, a user may utilize either of the NMD 103a or 103b (FIG. 1B) to control the Den zone before it is separated into the television zone and the listening zone. Once separated, the listening zone may be controlled, for example, by a user in the vicinity of the NMD 103a, and the television zone may be controlled, for example, by a user in the vicinity of the NMD 103b. As described above, however, any of the NMDs 103 may be configured to control the various playback and other devices of the MPS 100.

c. Example Controller Devices

FIG. 4A is a functional block diagram illustrating certain aspects of a selected one of the controller devices 104 of the MPS 100 of FIG. 1A. Controller devices in accordance with several embodiments can be used in various systems, such as (but not limited to) an MPS as described in FIG. 1A. Such controller devices may also be referred to herein as a "control device" or "controller." The controller device shown in FIG. 4A may include components that are generally similar to certain components of the network devices described above, such as a processor 412, memory 413 storing program software 414, at least one network interface 424, and one or more microphones 422. In one example, a controller device may be a dedicated controller for the MPS 100. In another example, a controller device may be a network device on which media playback system controller application software may be installed, such as for example, an iPhone™, iPad™ or any other smart phone, tablet, or network device (e.g., a networked computer such as a PC or Mac™).

The memory 413 of the controller device 104 may be configured to store controller application software and other data associated with the MPS 100 and/or a user of the system 100. The memory 413 may be loaded with instructions in software 414 that are executable by the processor 412 to achieve certain functions, such as facilitating user access, control, and/or configuration of the MPS 100. The controller device 104 may be configured to communicate with other network devices via the network interface 424, which may take the form of a wireless interface, as described above.

In one example, system information (e.g., such as a state variable) may be communicated between the controller device 104 and other devices via the network interface 424. For instance, the controller device 104 may receive playback zone and zone group configurations in the MPS 100 from a playback device, an NMD, or another network device. Likewise, the controller device 104 may transmit such system information to a playback device or another network device via the network interface 424. In some cases, the other network device may be another controller device.

The controller device 104 may also communicate playback device control commands, such as volume control and audio playback control, to a playback device via the network interface 424. As suggested above, changes to configurations of the MPS 100 may also be performed by a user using the controller device 104. The configuration changes may include adding/removing one or more playback devices to/from a zone, adding/removing one or more zones to/from a zone group, forming a bonded or merged player, separating one or more playback devices from a bonded or merged player, among others.

As shown in FIG. 4A, the controller device 104 may also include a user interface 440 that is generally configured to facilitate user access and control of the MPS 100. The user interface 440 may include a touch-screen display or other physical interface configured to provide various graphical controller interfaces, such as the controller interfaces 440a and 440b shown in FIGS. 4B and 4C. Referring to FIGS. 4B and 4C together, the controller interfaces 440a and 440b include a playback control region 442, a playback zone region 443, a playback status region 444, a playback queue region 446, and a sources region 448. The user interface as shown is just one example of an interface that may be provided on a network device, such as the controller device shown in FIG. 4A, and accessed by users to control a media playback system, such as the MPS 100. Other user interfaces of varying formats, styles, and interactive sequences may alternatively be implemented on one or more network devices to provide comparable control access to a media playback system.

The playback control region 442 (FIG. 4B) may include selectable icons (e.g., by way of touch or by using a cursor) that, when selected, cause playback devices in a selected playback zone or zone group to play or pause, fast forward, rewind, skip to next, skip to previous, enter/exit shuffle mode, enter/exit repeat mode, enter/exit cross fade mode, etc. The playback control region 442 may also include selectable icons that, when selected, modify equalization settings and/or playback volume, among other possibilities.

The playback zone region 443 (FIG. 4C) may include representations of playback zones within the MPS 100. The playback zones regions 443 may also include a representation of zone groups, such as the Dining Room +Kitchen zone group, as shown. In some embodiments, the graphical representations of playback zones may be selectable to bring up additional selectable icons to manage or configure the playback zones in the MPS 100, such as a creation of bonded zones, creation of zone groups, separation of zone groups, and renaming of zone groups, among other possibilities.

For example, as shown, a "group" icon may be provided within each of the graphical representations of playback zones. The "group" icon provided within a graphical representation of a particular zone may be selectable to bring up options to select one or more other zones in the MPS 100 to be grouped with the particular zone. Once grouped, playback devices in the zones that have been grouped with the particular zone will be configured to play audio content in synchrony with the playback device(s) in the particular zone. Analogously, a "group" icon may be provided within a graphical representation of a zone group. In this case, the "group" icon may be selectable to bring up options to deselect one or more zones in the zone group to be removed from the zone group. Other interactions and implementations for grouping and ungrouping zones via a user interface are also possible. The representations of playback zones in the playback zone region 443 (FIG. 4C) may be dynamically updated as playback zone or zone group configurations are modified.

The playback status region 444 (FIG. 4B) may include graphical representations of audio content that is presently being played, previously played, or scheduled to play next in the selected playback zone or zone group. The selected playback zone or zone group may be visually distinguished on a controller interface, such as within the playback zone region 443 and/or the playback status region 444. The graphical representations may include track title, artist name, album name, album year, track length, and/or other relevant information that may be useful for the user to know when controlling the MPS 100 via a controller interface.

The playback queue region 446 may include graphical representations of audio content in a playback queue associated with the selected playback zone or zone group. In some embodiments, each playback zone or zone group may be associated with a playback queue comprising information corresponding to zero or more audio items for playback by the playback zone or zone group. For instance, each audio item in the playback queue may comprise a uniform resource identifier (URI), a uniform resource locator (URL), or some other identifier that may be used by a playback device in the playback zone or zone group to find and/or retrieve the audio item from a local audio content source or a networked audio content source, which may then be played back by the playback device.

In one example, a playlist may be added to a playback queue, in which case information corresponding to each audio item in the playlist may be added to the playback queue. In another example, audio items in a playback queue may be saved as a playlist. In a further example, a playback queue may be empty, or populated but "not in use" when the playback zone or zone group is playing continuously streamed audio content, such as Internet radio that may continue to play until otherwise stopped, rather than discrete audio items that have playback durations. In an alternative embodiment, a playback queue can include Internet radio and/or other streaming audio content items and be "in use" when the playback zone or zone group is playing those items. Other examples are also possible.

When playback zones or zone groups are "grouped" or "ungrouped," playback queues associated with the affected playback zones or zone groups may be cleared or re-associated. For example, if a first playback zone including a first playback queue is grouped with a second playback zone including a second playback queue, the established zone group may have an associated playback queue that is initially empty, that contains audio items from the first playback queue (such as if the second playback zone was added to the first playback zone), that contains audio items from the second playback queue (such as if the first playback zone was added to the second playback zone), or a combination of audio items from both the first and second playback queues. Subsequently, if the established zone group is ungrouped, the resulting first playback zone may be re-associated with the previous first playback queue or may be associated with a new playback queue that is empty or contains audio items from the playback queue associated with the established zone group before the established zone group was ungrouped. Similarly, the resulting second playback zone may be re-associated with the previous second playback queue or may be associated with a new playback queue that is empty or contains audio items from the playback queue associated with the established zone group before the established zone group was ungrouped. Other examples are also possible.

With reference still to FIGS. 4B and 4C, the graphical representations of audio content in the playback queue region 446 (FIG. 4B) may include track titles, artist names, track lengths, and/or other relevant information associated with the audio content in the playback queue. In one example, graphical representations of audio content may be selectable to bring up additional selectable icons to manage and/or manipulate the playback queue and/or audio content represented in the playback queue. For instance, a represented audio content may be removed from the playback queue, moved to a different position within the playback queue, or selected to be played immediately, or after any currently playing audio content, among other possibilities. A playback queue associated with a playback zone or zone group may be stored in a memory on one or more playback devices in the playback zone or zone group, on a playback device that is not in the playback zone or zone group, and/or some other designated device. Playback of such a playback queue may involve one or more playback devices playing back media items of the queue, perhaps in sequential or random order.

The sources region 448 may include graphical representations of selectable audio content sources and/or selectable voice assistants associated with a corresponding VAS. The VASes may be selectively assigned. In some examples, multiple VASes, such as AMAZON's Alexa, MICROSOFT's Cortana, etc., may be invokable by the same NMD. In some embodiments, a user may assign a VAS exclusively to one or more NMDs. For example, a user may assign a first VAS to one or both of the NMDs 102a and 102b in the Living Room shown in FIG. 1A, and a second VAS to the NMD 103f in the Kitchen. Other examples are possible.

d. Example Audio Content Sources

The audio sources in the sources region 448 may be audio content sources from which audio content may be retrieved and played by the selected playback zone or zone group. One or more playback devices in a zone or zone group may be configured to retrieve for playback audio content (e.g., according to a corresponding URI or URL for the audio content) from a variety of available audio content sources. In one example, audio content may be retrieved by a playback device directly from a corresponding audio content source (e.g., via a line-in connection). In another example, audio content may be provided to a playback device over a network via one or more other playback devices or network devices. As described in greater detail below, in some embodiments, audio content may be provided by one or more media content services.

Example audio content sources may include a memory of one or more playback devices in a media playback system such as the MPS 100 of FIG. 1, local music libraries on one or more network devices (e.g., a controller device, a network-enabled personal computer, or a networked-attached storage ("NAS")), streaming audio services providing audio content via the Internet (e.g., cloud-based music services), or audio sources connected to the media playback system via a line-in input connection on a playback device or network device, among other possibilities.

In some embodiments, audio content sources may be added or removed from a media playback system such as the MPS 100 of FIG. 1A. In one example, an indexing of audio items may be performed whenever one or more audio content sources are added, removed, or updated. Indexing of audio items may involve scanning for identifiable audio items in all folders/directories shared over a network accessible by playback devices in the media playback system and generating or updating an audio content database comprising metadata (e.g., title, artist, album, track length, among others) and other associated information, such as a URI or URL for each identifiable audio item found. Other examples for managing and maintaining audio content sources may also be possible.

III. State Detection in a Region

Systems and methods in accordance with certain embodiments can use channel state information, such as signal strengths of portions of a wireless channel, for one or more signal paths between wireless devices to determine a state (e.g., locations, count of individuals, postures, gestures performed, etc.) for individuals in a region around and between various wireless devices of a system. In a number of embodiments, state can be determined by comparing changes in a signal over time and/or relative to a baseline signal. Processes in accordance with many embodiments can train machine learning models to evaluate channel state information to predict a state of a region (e.g., a region between a plurality of playback devices in a given area such as a home theater system or a stereo pair configuration). In numerous embodiments, systems can modify a system of wireless devices based on the predicted state for a region (e.g., a physical area between a plurality of playback devices, such as a living room where a home theater setup is positioned).

Figure 5:
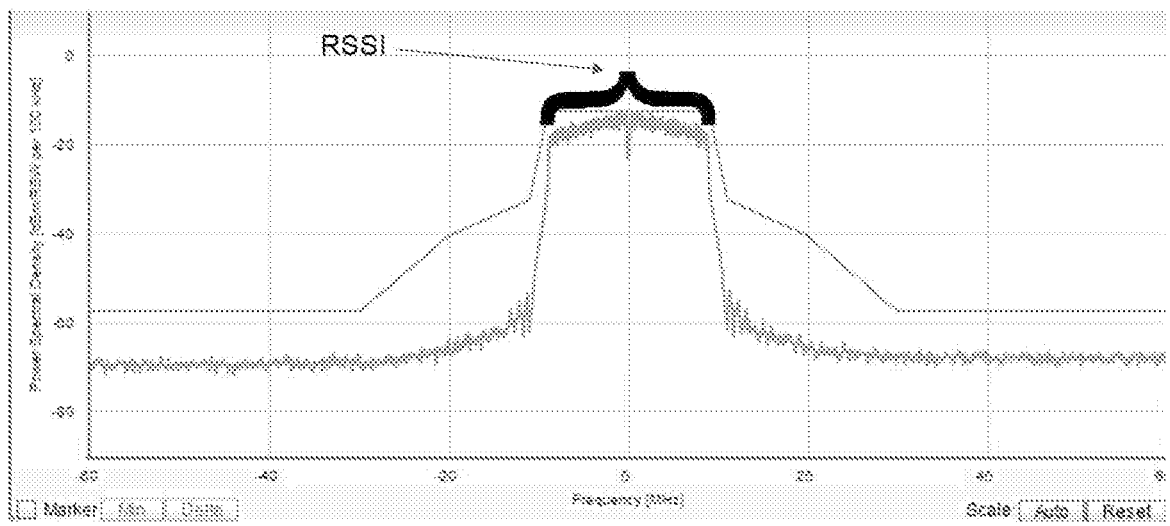
FIG. 5 illustrates an example of wireless signal strength measurements.
Figure 5:
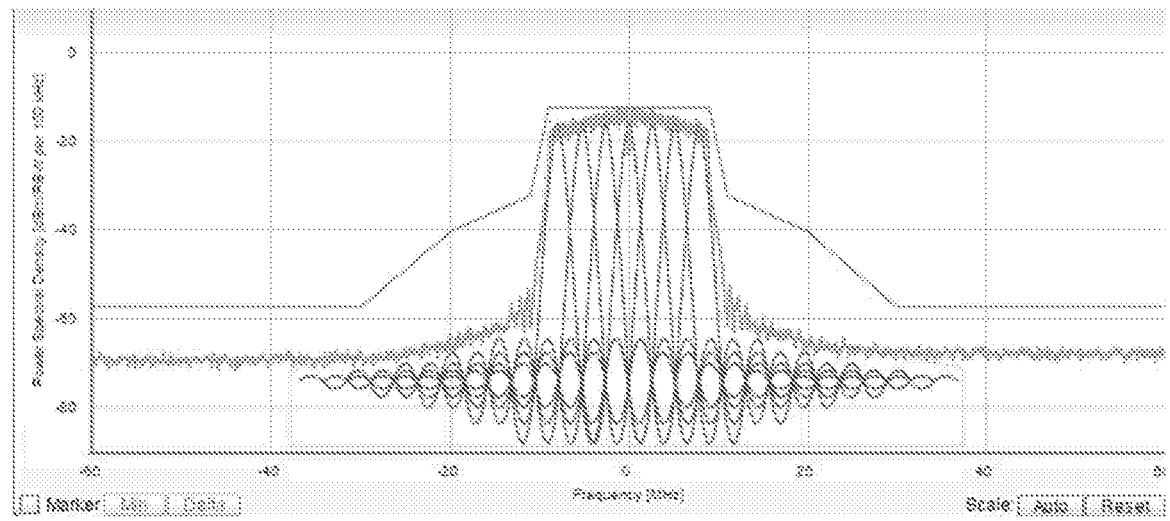

An example of wireless signal strength measurements is illustrated in FIG. 5. Conventional methods for measuring signal strength are often coarse, resulting in a single value for the wireless channel. The first chart 505 shows a conventional RSSI measurement that provides an average signal strength across the entire wireless communication channel. Instead of attempting to determine location based on standard RSSI measurements indicative of the energy in an entire channel, processes in accordance with various embodiments can instead use more granular information indicative of a state of the wireless channel (e.g., channel state information). Examples of such channel state information include signal strength indicators for at least some (if not all of) the portions (e.g., subcarriers) within that wireless channel. The second chart 510 shows an example of multiple subcarriers within the wireless channel, which can provide much finer details in the measured wireless signal strength. Subcarriers in accordance with some embodiments can be sensitive to much smaller motions and/or changes to individuals in a space, which can be lost in the aggregate values of a wireless channel. In addition, different subchannels can react differently to elements (e.g., individuals, furniture, walls, etc.) in the space, providing additional information that cannot be captured in aggregate channel values. Processes in accordance with many embodiments can use subcarrier signal strengths to determine the state of a region at a far finer level of detail.

a. Processes i. State Detection

Figure 6:
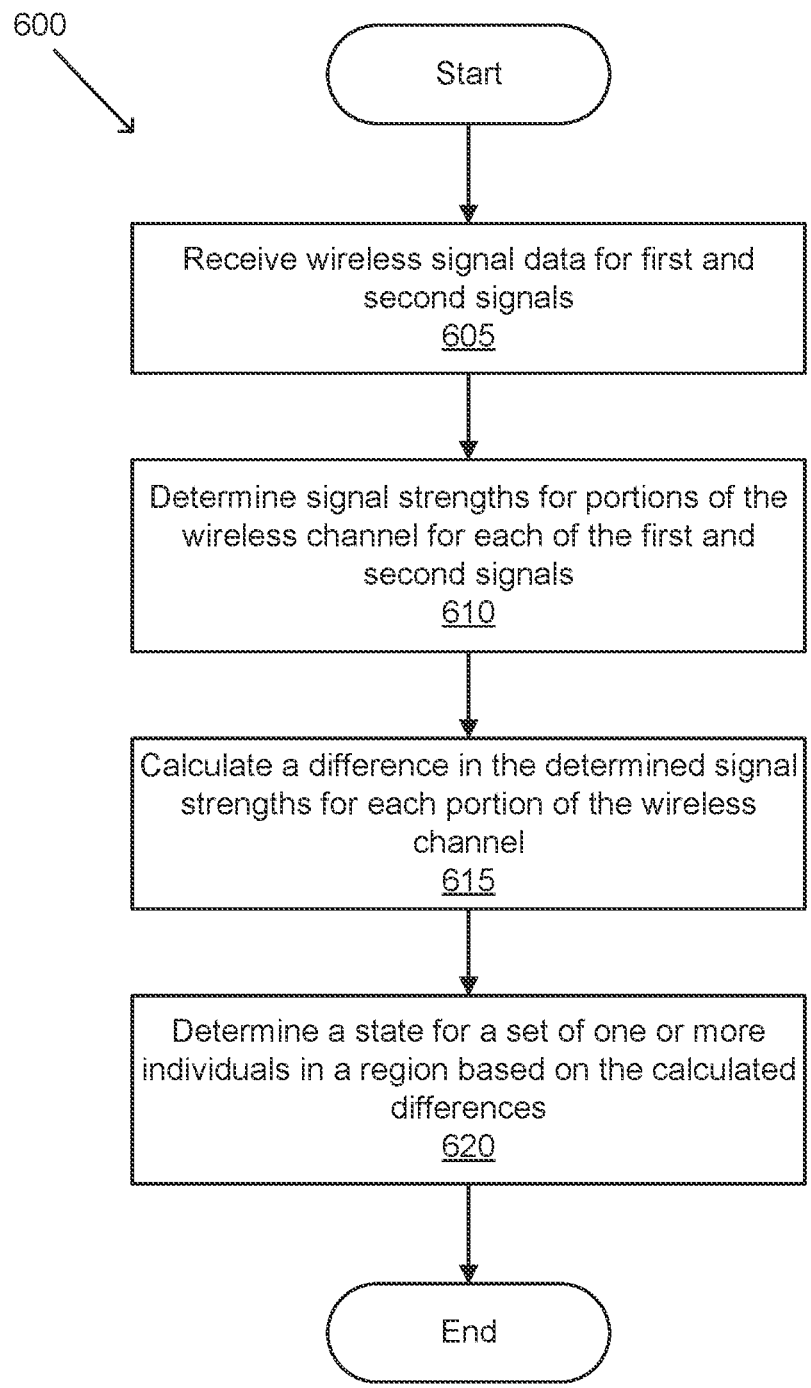
FIG. 6 conceptually illustrates an example of a process for determining a state for individuals in a region between devices of a system in accordance with aspects of the disclosure.

An example of a process 600 for determining a state of a region with devices of a system is conceptually illustrated in FIG. 6. Process 600 may be performed by, for example, one or more playback devices of a plurality of playback devices within a space to determine the state of a region between the plurality of playback devices (e.g., a state of a living room where a plurality of playback devices are configured in a home theater system, a state of a bedroom where a plurality of playback devices are configured in a stereo pair, or a state of a kitchen where a plurality of playback devices are configured in a synchrony group, etc.). Process 600 receives (605) wireless signal data for first and second signals. First and second signals in accordance with numerous embodiments can include signals measured at different points in time and/or along different signal paths. For example, processes in accordance with some embodiments can measure a first signal as a baseline signal for a base state (e.g., when no one is expected to be within a given region), while the second signal(s) are measured to determine a test state of the region, based on the relative wireless signal strengths for different portions of the first and second signals at a particular time. Signal data for a particular signal path in accordance with various embodiments can include a normalized signal strength based on the strength of the signal in each direction between a pair of devices. In a variety of embodiments, multiple signals can be measured for each of several different signal paths.

Wireless signal data in accordance with a number of embodiments can include, but is not limited to, multimedia data (e.g., audio and/or video data), synchronization data, null packets, signal characteristic data (e.g., signal strength), and/or other network data. In a variety of embodiments, processes can be performed in a media playback system (e.g., in a synchrony group/bonded zone) with multiple wireless playback devices. Wireless signal data in accordance with a number of embodiments can be captured from the normal traffic between the playback devices during playback. In some wireless communication standards, the data bits to be transmitted are distributed among subcarriers assigned for data transmission (the remaining subcarriers are reserved for other purposes such as guard bands, etc.). In many embodiments, existing communications between wireless devices can be used because identifying the signal strength of the subcarriers does not interfere with the radio's ability to read the contents of the message and does not require any particular packet structure/contents.

Alternatively, or conjunctively, measurement signals can be transmitted specifically for the purpose of localizing individuals in a region. For example, processes in accordance with certain embodiments can determine that the frequency of messages is too low (e.g., less than a minimum threshold of packet transmissions) and/or that there is no natural traffic between devices along a given signal path, and may create additional network traffic by generating and transmitting measurement signals (e.g., with null packets).

Process 600 determines (610) signal strengths for portions of the wireless channel for each of the first and second signals. Signal strengths for portions of a wireless channel in accordance with various embodiments can be measured and/or provided directly by the wireless radio. In numerous embodiments, portions of a wireless channel can include various divisions of the wireless channel, including (but not limited to) individual subcarriers, subchannels (e.g., groups of subcarriers), etc. Although many of the examples described herein may refer to subcarriers, one skilled in the art will recognize that similar systems and methods can be used with various different divisions of a wireless channel, including (but not limited to) subchannels, without departing from the scope of the present disclosure.

In numerous embodiments, rather than all of the portions of a wireless channel, only a subset of the portions are analyzed. The subset of portions in accordance with many embodiments can be limited such that each portion is discrete and does not overlap with any other portion. In numerous embodiments, subsets can include at least a pair of overlapping portions, where the signal strength of the overlapping portion contributes to the measured signal strength for both portions of the pair.

Further, water can absorb/reflect the frequencies within each of these subcarriers differently. In a number of embodiments, the subset of subcarriers includes subcarriers that have a higher correlation with the detection/absence of a human given the physical properties of humans (which are essentially water). Subcarriers selected for the subset of subcarriers in accordance with certain embodiments can be different for a 5 GHz channel than for a 2.4 GHz channel and/or a 6 GHz channel.

In a number of embodiments, once the received signal strength values have been determined for the set/subset of the portions of the wireless channel, processes in accordance with numerous embodiments can apply a set of one or more denoising filters to reduce the noise for each sub-carrier in a wireless channel. Denoising filters in accordance with some embodiments can include (but are not limited to) linear Kalman filters, extended Kalman filters, moving-horizon-estimators, etc.

Process 600 calculates (615) a difference in the determined signal strengths for each portion of the wireless channel. In a variety of embodiments, differences can be calculated in a variety of ways, such as (but not limited to) based on an expected signal strength for a given portion on a given signal path, relative to a signal strength for a corresponding portion for a signal on a different signal path, relative to a baseline signal strength measured on the same signal path, etc.

Process 600 determines (620) a state for a set of one or more individuals in a region based on the calculated differences. For a given region between the wireless devices of a system, states can include (but are not limited to) the position (or location) of individuals, a count of the individuals, etc. In numerous embodiments, determining the location of an individual can include determining which signal paths are blocked by an individual (e.g., based on the reduction of signal strengths for certain portions of the wireless channel), and estimating a location (e.g., using triangulation) based on the blocked paths. Counting individuals in a space can include determining which signal paths are blocked, how many signal paths are blocked, and/or a level of signal strength reduction (e.g., where signal strengths can be reduced by greater amounts for signal paths blocked by more individuals) for a signal path. Additional details regarding signal-strength based localization and localizing individuals in a space using machine learning models may be found, for example, in U.S. patent application Ser. No. 16/775,212, titled "Systems and Methods for Playback Device Management," filed on Jan. 28, 2020, the disclosure of which is incorporated by reference herein in its entirety.

It should be understood that one or more operations performed as part of process 600 may, in some instances, be performed implicitly. For example, the process 600 may employ one or more models designed to determine a state for a set of one or more of individuals in a region directly based on the determined signal strengths for portions of the wireless channel determined (610). In this example, the one or more models may implicitly perform a variety of implicit operations including calculation of a difference between determined signal strengths for each portion of the wireless channel (615). Thus, one or more operations of process 600 described above may be performed implicitly.

Analyzing the received signal strength on a subcarrier level, instead of on a channel level for a given packet transmission, has yielded significantly better results that are more accurate and discernable than through the use of channel-wide signal strengths alone. In many cases, the variation in signal strength when a human walks between a line-of-sight path of two wireless radios is much more pronounced when looking at changes in signal strength at the subcarrier level instead of at the channel level.

In a variety of embodiments, beyond the calculated signal strengths for portions of the wireless channel, other context information can also be used to determine the state for a set of individuals in a region. Such context information can include (but is not limited to) information about the household (e.g., whether they live in: an apartment/condo complex or a house/an urban area or suburban area). Context information in accordance with numerous embodiments can be indicative of, among other things, the likelihood of their being significant background noise in the relevant frequency bands. In a variety of embodiments, context information can be used to determine expected signal strengths for various portions of a wireless channel and/or to adjust calculated differences for different signal paths.

Localizing individuals in a region can be used in a variety of different applications. In several embodiments, audio characteristics of playback devices can be updated based on a determined user's location. In various embodiments, audio characteristics in accordance with a variety of embodiments can be modified to move an acoustic "sweet spot" based on the user's location. For example, processes in accordance with many embodiments can detect that a person is sitting closer to the left speakers than the right speakers and adjust the balance to make the right speakers slightly louder than the left ones. In the event that the number of users is high and/or indeterminate (e.g., when there is no discernable pattern, the number of detected users is above some threshold, etc.), processes in accordance with a number of embodiments can return the settings of a home theater system to default settings. Additional details and example applications regarding the update of audio characteristics based on the determined location of a user may be found, for example, in U.S. Pat. No. 9,084,058, titled "Sound Field Calibration Using Listener Localization," issued on Jul. 14, 2015, the disclosure of which is incorporated by reference herein in its entirety.

In some embodiments, locations of individuals can be used as a part of a home security system. Processes in accordance with a number of embodiments can allow a user to specify that they are leaving the house for some period of time (e.g., via a controller application or via a voice command) that causes a media playback system to enter a security mode. While in security mode, the system in accordance with certain embodiments can send monitoring signals (e.g., null packets) to analyze changes in received signal strength. Upon detection of unusual activity (e.g., detecting individuals in the space of the home theater system while in the security mode), processes in accordance with a variety of embodiments can trigger a set of one or more events, including (but not limited to) alerting a user (e.g., via a mobile message, email, etc.), sending a command to another Internet of Things (IoT) device in the user's home (e.g., a camera, an alarm, lights, etc.), recording sound on microphones of the playback devices, etc.

In addition to localizing individuals in a space, systems and methods in accordance with several embodiments can use signal strengths for portions of a wireless channel to determine relative positions of playback devices (e.g., in a home theater setup). By measuring signal strengths of portions of the wireless channel (i.e., those that are not affected by the presence of people), processes in accordance with certain embodiments can more accurately measure signal strengths and positions of devices in a space where people may normally interfere with the wireless signals. The relative positions of playback devices can be used in various applications, such as (but not limited to) to modify characteristics of the playback devices, identify improper speaker placement, etc. Additional details regarding the determination of relative positions of playback devices may be found, for example, in U.S. Pat. No. 9,949,054, titled "Spatial mapping of audio playback devices in a listening environment," issued on Apr. 17, 2018, the disclosure of which is incorporated by reference herein in its entirety.

Figure 7:
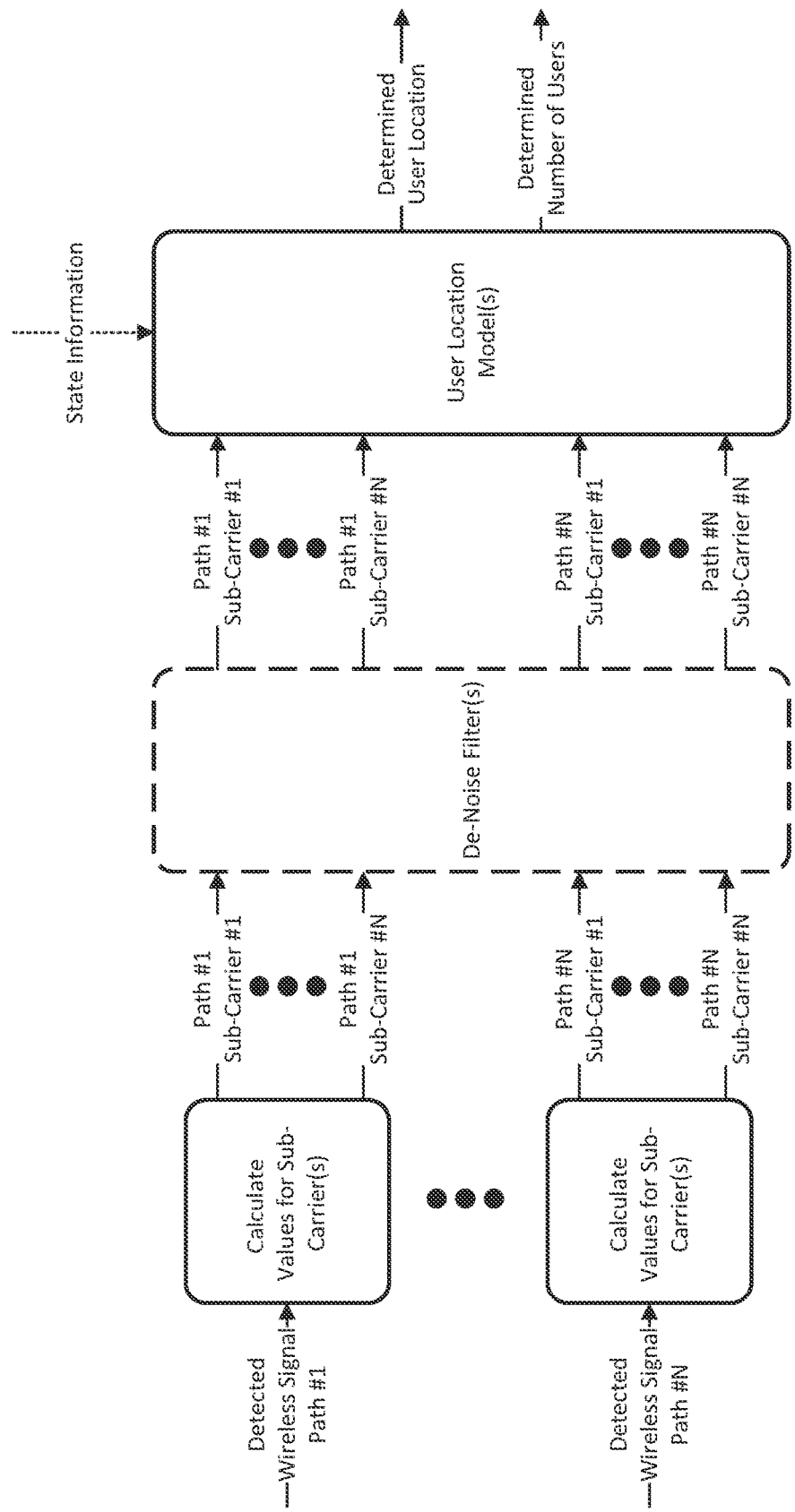
FIG. 7 illustrates an example of a data processing flow in accordance with aspects of the disclosure.

An example of a data processing flow in accordance with aspects of the disclosure is illustrated in FIG. 7. In this example, wireless signals for a number of different signal paths are detected. Signal strength values (e.g., amplitude values) for sub-carriers of the signals (and/or signal strength difference values between the sub-carriers of the signals and another value such as a baseline value, a signal strength value of another sub-carrier, or a signal strength value of the sub-carrier at a different point in time) are calculated and passed through a set of one or more de-noise filters. De-noising filters in accordance with some embodiments can include (but are not limited to) linear Kalman filters, extended Kalman filters, moving-horizon-estimators, etc. The signals can then be passed to a set of one or more user location and/or gesture models that can be used to determine one or more of: user locations, a number of users, and/or gesture(s) performed by one or more users. In several embodiments, the user location models can also take as input state information (or context information) that describes the environment of the system of wireless devices. In many embodiments, de-noise filters can be applied based on expected noise levels that are determined based on the context information.

ii. Classification

In certain embodiments, state detection can be performed using classification models that are trained to predict a current state based on received wireless signal data. Classification in accordance with some embodiments can be performed on an individual device (e.g., a playback device) in a system. However, as classification models can be computationally expensive, classification in accordance with several embodiments can be performed by other devices (e.g., servers, cloud services, etc.) over a network. In numerous embodiments, classification can be distributed across multiple devices in a system and/or assigned to a set of one or more devices based on the processing capabilities and/or availabilities of devices in the system.

Figure 8:
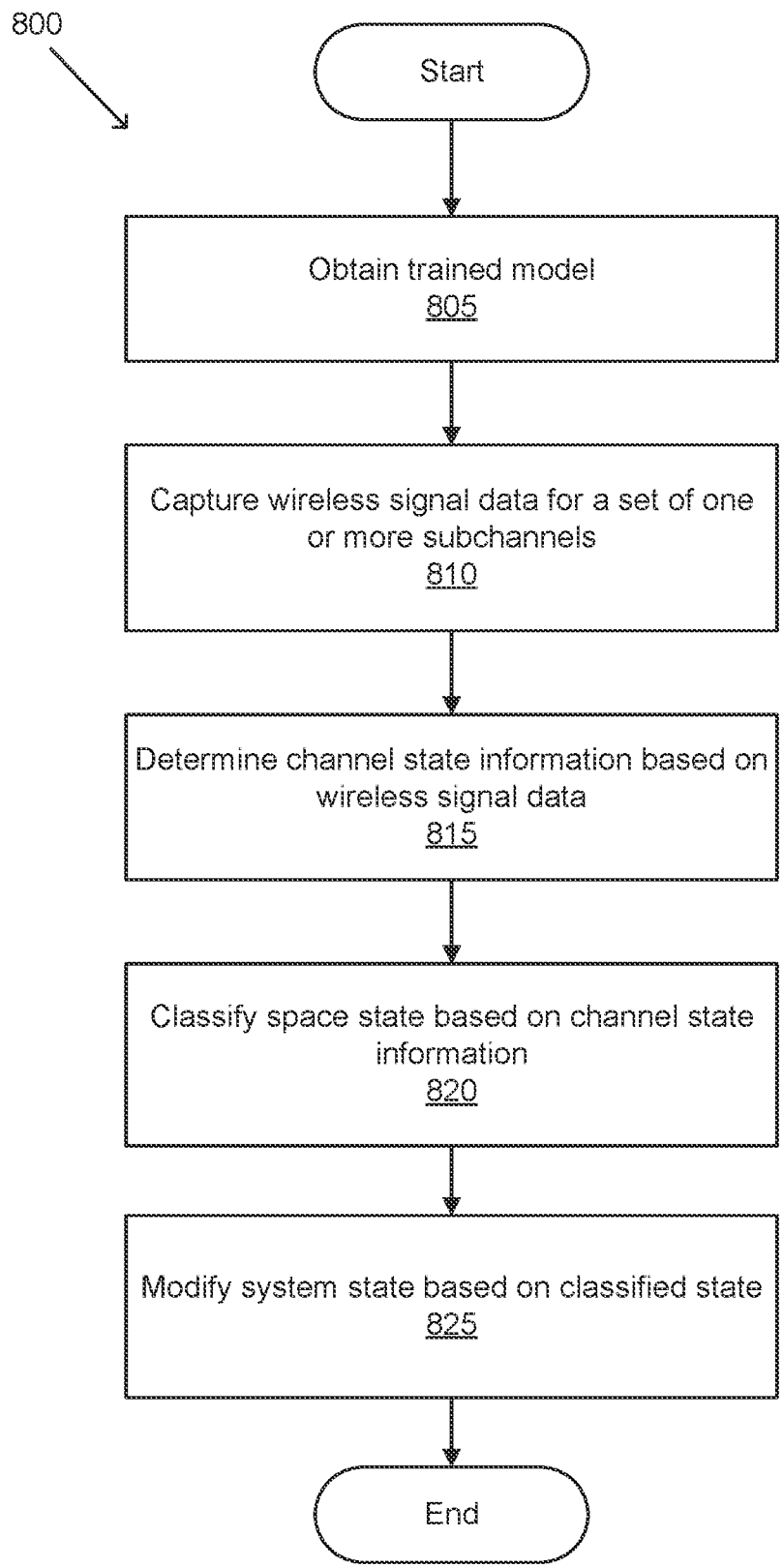
FIG. 8 conceptually illustrates an example of a process for classifying space state.

An example of a process 800 for classifying space state is conceptually illustrated in FIG. 8. Process 800 may be performed by, for example, one or more playback devices of a plurality of playback devices within a space to classify a state of the space between the plurality of playback devices (e.g., a state of a living room where a plurality of playback devices are configured in a home theater system, a state of a bedroom where a plurality of playback devices are configured in a stereo pair, or a state of a kitchen where a plurality of playback devices are configured in a synchrony group, etc.). Process 800 obtains (805) a trained model.

Trained models in accordance with a number of embodiments can include various models, such as (but not limited to) regression models, neural networks, decision trees, etc. In numerous embodiments, trained models can be trained to predict a state based on wireless signal data for individual signal samples (e.g., via a convolutional neural network (CNN)). Trained models in accordance with several embodiments can operate on wireless signal data for a series of signal samples over time (e.g., via a recurrent neural network (RNN)). Training models in accordance with a number of embodiments is described in further detail below with reference to FIG. 9.

Process 800 captures (810) wireless signal data for a set of one or more subchannels. Wireless signal data in accordance with many embodiments can include data for one or more samples of each wireless subchannel. In some embodiments, only a subset of the subchannels are used to classify the state of a region. Some subchannels may not be used for transmission at all. In a variety of embodiments, a subset of the subchannels are identified as being particularly relevant to the classification process and are selected for use with the classification process.

In some embodiments, processes can begin a capture of wireless signal data for classification upon detecting a change in the wireless signal data. For example, processes in accordance with various embodiments can determine whether a difference in the measured signal characteristics (e.g., signal strength, phase shift, etc.) and the expected signal characteristics exceeds a threshold. In numerous embodiments, upon determining that the difference exceeds the threshold, processes can use the captured wireless signal data and/or initiate a listening window to capture additional samples. Processes in accordance with some embodiments can generate additional packets (e.g., null packets) to be transmitted for a listening window in order to increase the resolution of the samples captured during the listening window.

Processes in accordance with certain embodiments can pre-process wireless signal data before proceeding with the classification process. Pre-processing in accordance with many embodiments can include various processes for cleaning and/or normalizing the data, such as (but not limited to) scaling the wireless signal data (e.g., normalizing signal strength data for each subcarrier to a range of [0,1]). In numerous embodiments, a group of packets (or samples) is captured and pre-processing can include filtering the data to remove outliers (e.g., samples with a z-score with a magnitude greater than 3).

Process 800 determines (815) channel state information based on the wireless signal data. Channel state information (CSI) in accordance with various embodiments can describe a given RF channel between a transmitter and a receiver. CSI in accordance with some embodiments can provide information for each subcarrier about a signal sent over a given RF channel. In several embodiments, CSI can include information that describes an amplitude and/or phase shift for each path and subcarrier in a system. In several embodiments, CSI can include in-phase and quadrature (I/Q) component data to describe samples of the wireless signal.

In a number of embodiments, CSI is calculated to compute the difference between a received signal and the signal that was sent. In some embodiments, CSI can include a model (e.g., channel matrix) that describes a transformation between a known signal and a measured signal for each transmitter-receiver-subcarrier combination. Because CSI is based on the difference between a received signal and the expected signal, comparisons of CSI in accordance with a variety of embodiments can isolate effects (e.g., multipath fading, scattering, etc.) of a change in state on each subchannel and can be made across different packet types, without regard to the content of the signal. For example, the CSI of a pilot signal (e.g., captured when no one is in a region) can be compared to the CSI of a test signal to identify changes in each subchannel.

Process 800 classifies (820) the space state based on the channel state information using the trained model. The space state in accordance with some embodiments can include (but is not limited to) specifying a number of individuals in a region, identifying particular individuals, detecting gestures, detecting postures and/or positions, etc. CSI for subcarriers can provide much finer details for a given region, which can allow individuals to be identified and much smaller motions to be detected. Especially in regions where there will be significant signal reflections (e.g., with walls, obstructions, etc.) wireless signal data at the subcarrier level can provide rather detailed information about a region.

Trained models in accordance with certain embodiments can take one or more sets of data as inputs, including (but not limited to) CSI, amplitude data, phase data, I/Q component data, context data, etc. For example, in a number of embodiments, a set of inputs to the trained model include 256 in-phase values and 256 quadrature values in a 1-D array of 512 values, normalized to values between 0 and 1. Inputs to the trained model can include samples from multiple different packets across time. In some embodiments, each sample can be independently classified and used as inputs to another model to predict a final state. Processes in accordance with numerous embodiments can feed a series of inputs to the model (e.g., in an RNN). In several embodiments, multiple models can be used to classify CSI of a system. For example, separate models can be trained on different portions of the channel, where each model uses the same portions of the channel across multiple different signal paths.

Trained models in accordance with a number of embodiments can be used to determine a state, such as detecting a gesture performed by an individual in a region. Gesture detection can be used for various functions, such as (but not limited to) playback control, system management, user interface controls, etc. Gestures that can be detected in accordance with various embodiments can include (but are not limited to) sitting down, standing up, walking parallel to a link, reading out loud, shaking your head, nodding your head, moving your hand from side to side, etc.

Process 800 modifies (825) the system state based on the classified state. Modifying a system state in accordance with certain embodiments can include (but is not limited to) modifying audio characteristics (e.g., volume, balance, etc.), modifying playback controls (e.g., playing different tracks), providing alerts and/or notifications, and/or system controls (e.g., power off, etc.). For example, modifying the system state can include initiating playback when a person enters a room or sits on the couch, stopping playback when a person exits a room, and/or transferring playback to different sets of speakers as an individual moves throughout a home. In various embodiments, processes can modify volume levels based on conversations detected from wireless signal data.

While specific processes for classifying space state are described above, any of a variety of processes can be utilized to classify space state as appropriate to the requirements of specific applications. In certain embodiments, steps may be executed or performed in any order or sequence not limited to the order and sequence shown and described. In a number of embodiments, some of the above steps may be executed or performed substantially simultaneously where appropriate or in parallel to reduce latency and processing times. In some embodiments, one or more of the above steps may be omitted.

iii. Training

Systems and methods in accordance with some embodiments train models to predict (or classify) a space state based on wireless signal data. In a variety of embodiments, processes use supervised learning to train models to predict a state based on subcarrier wireless signal data. In numerous embodiments, trained models can be trained to predict a state based on wireless signal data for individual signal samples (e.g., via a convolutional neural network (CNN)). Trained models in accordance with several embodiments can operate on wireless signal data for a series of signal samples over time (e.g., via a recurrent neural network (RNN)).

Trained models in accordance with a number of embodiments can include a combination of one or more various models, such as (but not limited to) regression models, neural networks, decision trees, etc. In a number of embodiments, separate models can be trained for various situations. Processes in accordance with several embodiments can train separate models for different operating environments (e.g., for each home), for different users, and/or different functions (e.g., motion detection, gesture detection, localization, etc.).

Figure 9:
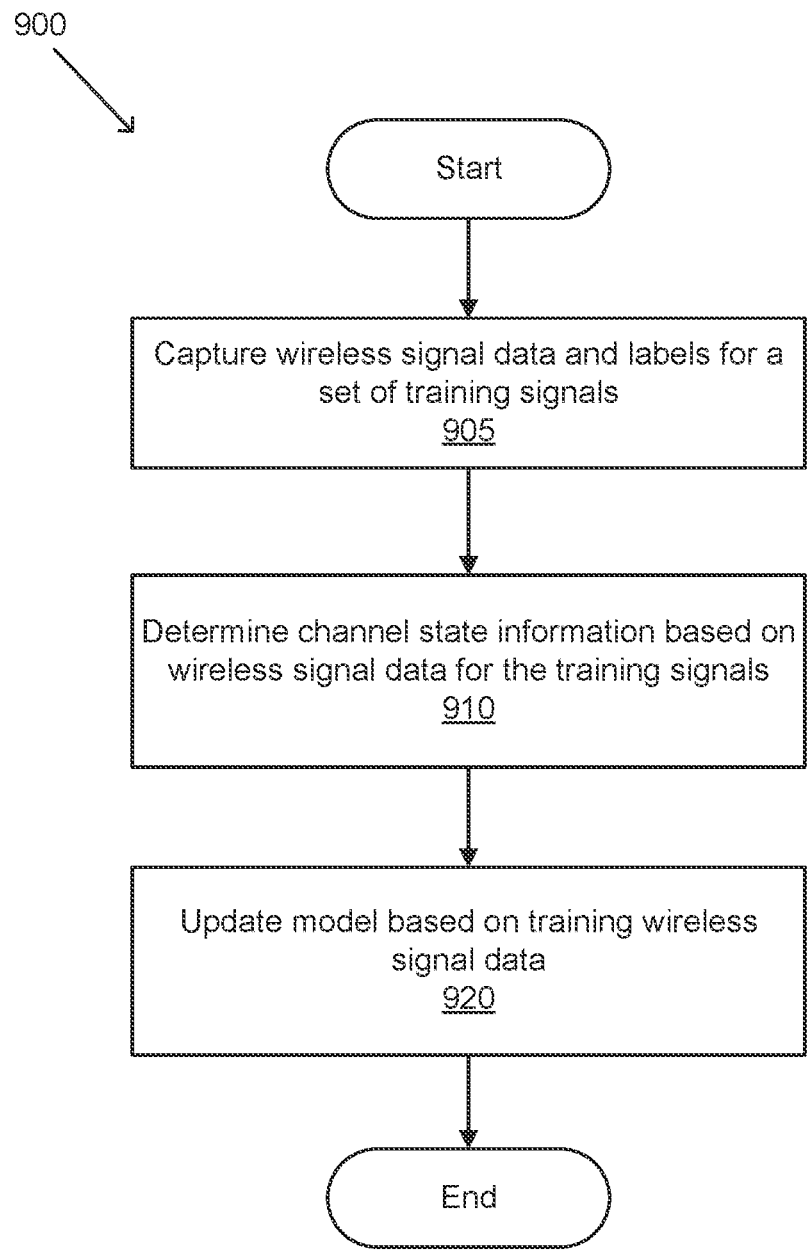
FIG. 9 conceptually illustrates an example of a process for training a model in accordance with aspects of the disclosure.

An example of a process for training a model in accordance with aspects of the disclosure is illustrated in FIG. 9. In a number of embodiments, because training models can require significant processing and memory, models can be trained separately from the devices where the trained models will be used. Processes in accordance with various embodiments can collect information from a local system (e.g., a playback system in a home) and train models over a network (e.g., at a cloud service, at network servers, etc.). In this manner, models can be trained on data specific to a given environment.

Process 900 captures (905) wireless signal data and labels for a set of training signals. Wireless signal data in accordance with several embodiments can include various types of data for subcarriers of a wireless signal, as described throughout this specification. Wireless signals in accordance with a number of embodiments can be captured from various devices in the system, such as (but not limited to) wireless access points, wireless playback devices, mobile devices, controllers, Internet of Things (IoT) devices, etc. In a variety of embodiments, training wireless signal data can be captured during a set-up process, where training data can be labeled based on instructions provided to a user for each set of captured wireless signal data. For example, for gesture detection, a process can instruct a user to perform a particular gesture, capture wireless signal data, and label the captured data to identify the particular gesture.

Process 900 determines (910) channel state information based on the wireless signal data for the training signals. As described herein, channel state information in accordance with numerous embodiments can include various types of data indicative of one or more subcarriers of a wireless signal, such as (but not limited to) Q/I component data, amplitude, phase, etc.

Process 900 updates (920) a model based on the training wireless signal data. Updating the model in accordance with numerous embodiments can include updating weights of a neural network based on predictions from the neural network and the labels of the training wireless data. In some embodiments, models can be updated using backpropagation. Models in accordance with many embodiments can include neural networks with one or more hidden layers and one or more fully connected layers that can be used to classify the inputs into a set of classes (or space states).

In a number of embodiments, processes can update models in a manner to allow the models to better generalize. For example, processes in accordance with a variety of embodiments can use training wireless data that spans various conditions, such as (but not limited to) different locations, different persons, different performances of a same gesture, persons performing a gestures at different positions in a region, etc.

While specific processes for training models for space state classification are described above, any of a variety of processes can be utilized to determine space states as appropriate to the requirements of specific applications. In certain embodiments, steps may be executed or performed in any order or sequence not limited to the order and sequence shown and described. In a number of embodiments, some of the above steps may be executed or performed substantially simultaneously where appropriate or in parallel to reduce latency and processing times. In some embodiments, one or more of the above steps may be omitted.

B. Examples i. Localization

Figure 10:
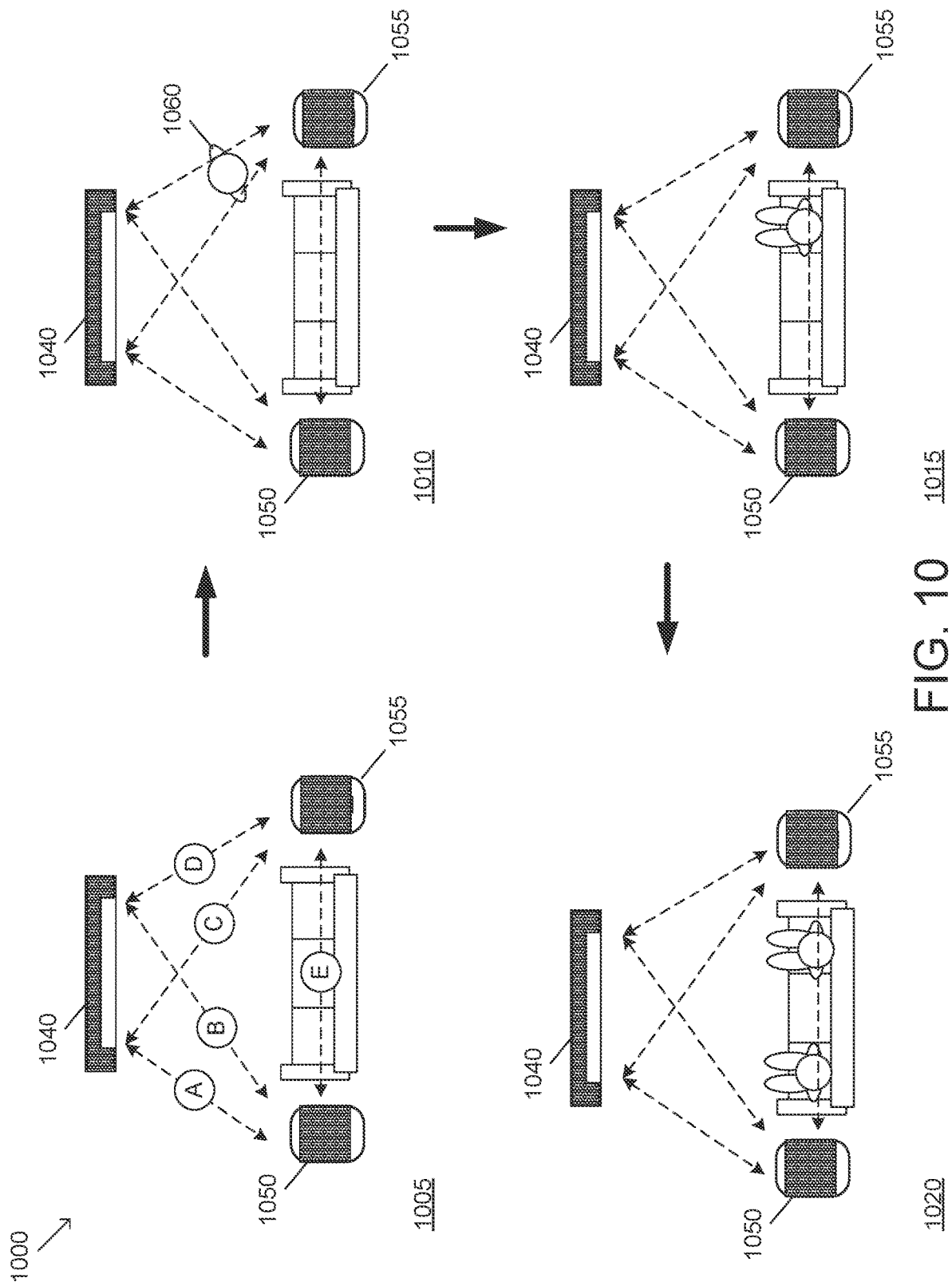
FIG. 10 illustrates an example of localization based on wireless signals in accordance with aspects of the disclosure.

An example of localization based on wireless signals in accordance with aspects of the disclosure is illustrated in four stages 1005-1020 of FIG. 10. The first stage 1005 shows different signal paths A-E (illustrated as dashed lines) between playback devices of a home theater system. In this example, audio packets are transmitted from the soundbar 1040 to the rear satellites 1050 and 1055 during normal operation. The satellites also transmit packets to the soundbar to obtain timing information to keep their audio playback rates in sync (i.e., to avoid drift between the speakers). Synchronization packets can include (but are not limited to) polling messages associated with a network time protocol (e.g., NTP, SNTP, PTP, etc.). In a number of embodiments, when other signals (e.g., audio or sync) are not sent between certain wireless devices, monitoring signals may be periodically sent between the devices to monitor for individuals in the space between the speakers. In various embodiments, the signal paths can include signals in one or both directions between antennas of the playback devices.

Playback devices in accordance with several embodiments may each have multiple antennas. In several embodiments, playback devices can include a multiple-input and multiple-output (MIMO) system with multiple antennas that are spatially diverse (e.g., a 3×3 MIMO or a 4×4 MIMO). For example, one antenna may be located proximate one end of a soundbar while a second antenna may be located proximate an opposite end of the soundbar. In numerous embodiments, the signals from each of these antennas can be separately processed/analyzed before being combined (e.g., coherently) within the radio chip. Accordingly, in certain embodiments, the radio could identify the detected signal strength of a subcarrier on an antenna-by-antenna basis.

In the second stage 1010, a person 1060 has entered the region between the playback devices. In this position, the person is blocking the signal paths C and D. In many embodiments, the position of an individual can be determined based on signal strengths for portions of a wireless channel, as described throughout this disclosure.

The third stage 1015 shows that a person is seated on a couch between speakers 1050 and 1055. In this stage, an individual is blocking signal path E, indicating that the user is somewhere between the two satellite speakers 1050 and 1055.

The fourth stage 1020 shows that two people are seated on the couch between speakers 1050 and 1055. In a number of embodiments, the state of the region can include the number of people in the region. Processes in accordance with some embodiments can determine the number of people based on a various factors including (but not limited to) the number of signal paths that are blocked, the strength of a given path (i.e., signal strengths for a signal path blocked by more than one individual may be more attenuated).

Although many of the examples described herein refer to applications with playback devices in a home theater system, one skilled in the art will recognize that similar systems and methods can be used with a variety of wireless devices, including (but not limited to) wireless access points, Internet of Things (IoT) devices, mobile devices, etc., without departing from this description.

ii. Gesture Detection

In certain embodiments, state detection systems in accordance with some embodiments can be used to detect gestures performed in a region. Gestures can include (but are not limited to) sitting down, standing up, walking, running, speaking, hand motions, etc. Gesture detection in accordance with numerous embodiments can be performed based on wireless signal data for one or more subcarriers of a wireless channel. In many cases, the wireless signal data will be affected by reflections of the signal from walls and other obstacles. The effect of the reflections on the captured wireless signal data can increase the accuracy of gesture detection, especially when the gesture does not occur in the direct line of sight between a transmitter and receiver.

Figure 11:
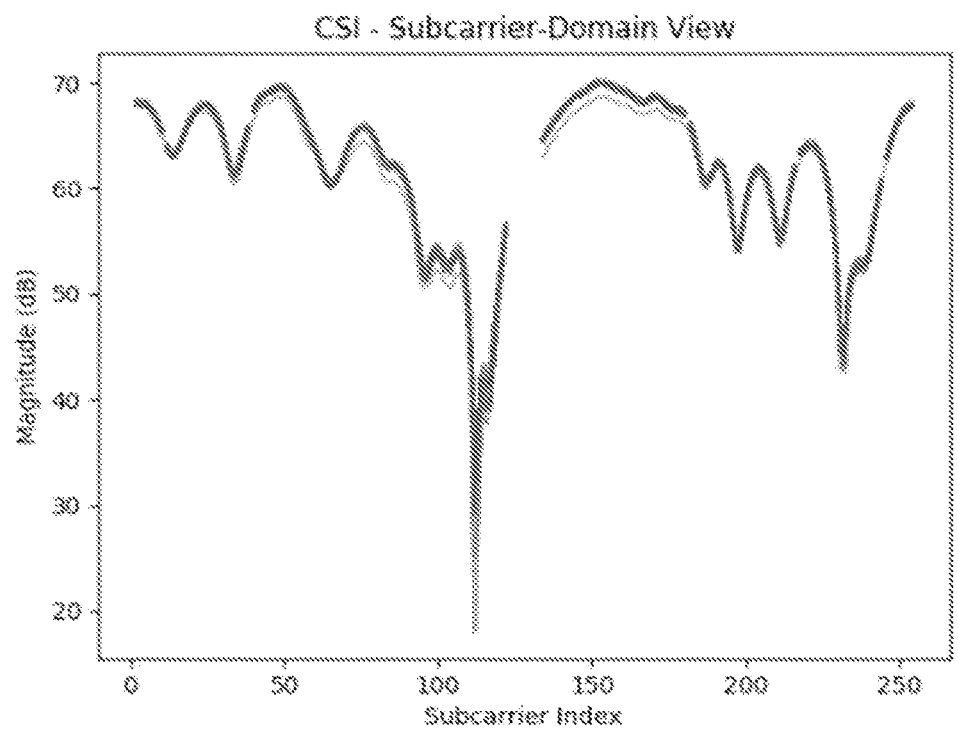
FIG. 11 illustrates examples of presence detection based on subcarrier signal characteristics in accordance with aspects of the disclosure.
Figure 11:
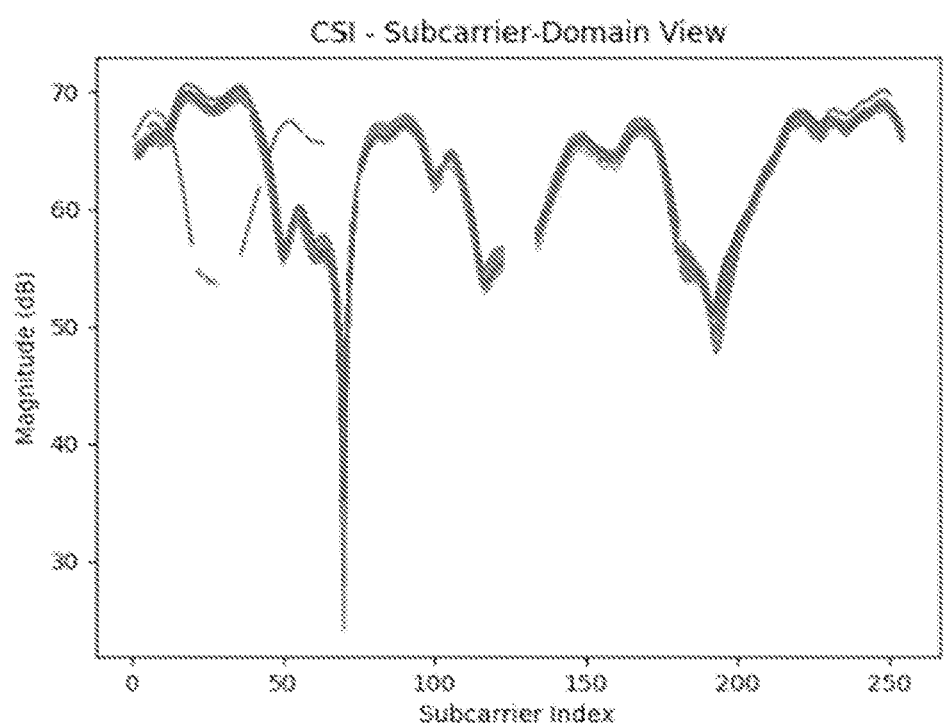

An example of presence detection based on subcarrier signal characteristics in accordance with aspects of the disclosure is illustrated in FIG. 11. The first chart 1105 shows a baseline measurement of subcarrier signal strengths captured with no one in the region between and around the wireless devices. This chart shows the measurement of 800 different packets captured in the space. As there is no movement in the space, the measurements are all very similar.

The second chart 1110 shows changes in the signal strengths when a person stands in the space. As can be seen, although the overall signal strength is similar, the effect of the person's presence on individual subcarriers is significant. Again, as the person is not moving, the measurements of the packets over time are similar. However, as people that are standing cannot help but move, the variance in the signals (shown by the thickness of the line) is greater than when there is no one in the space at all.

Figure 12A:
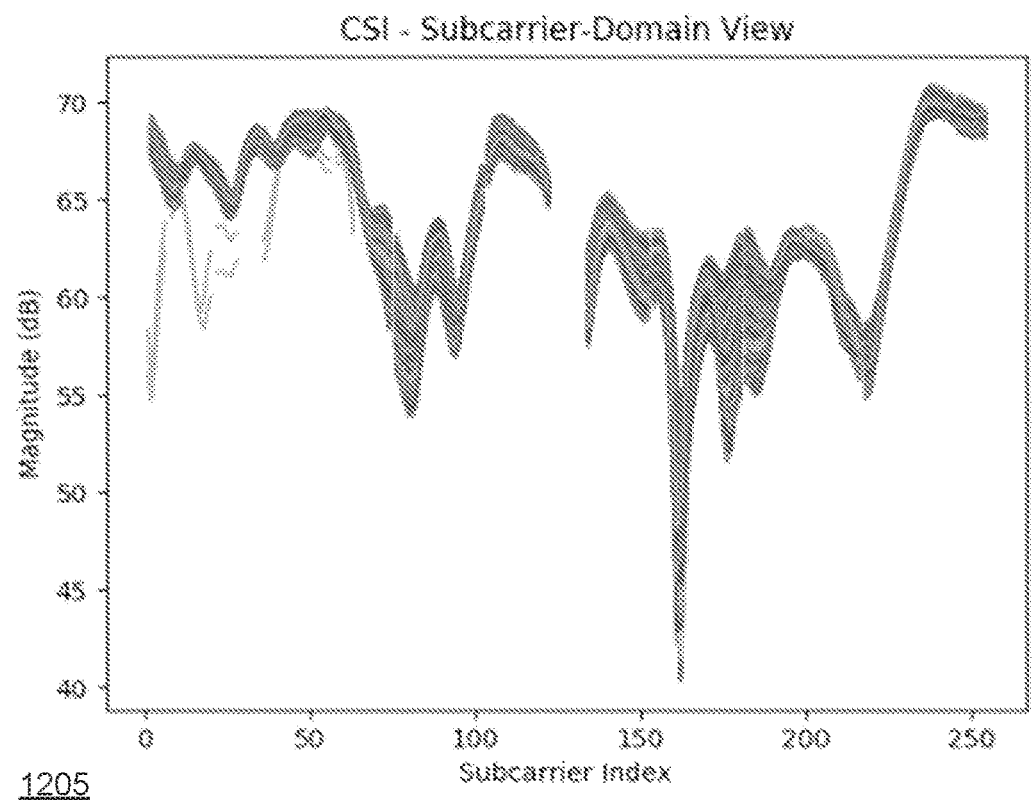
FIGS. 12A and 12B illustrate examples of gesture detection based on subcarrier signal characteristics in accordance with aspects of the disclosure.
Figure 12A:
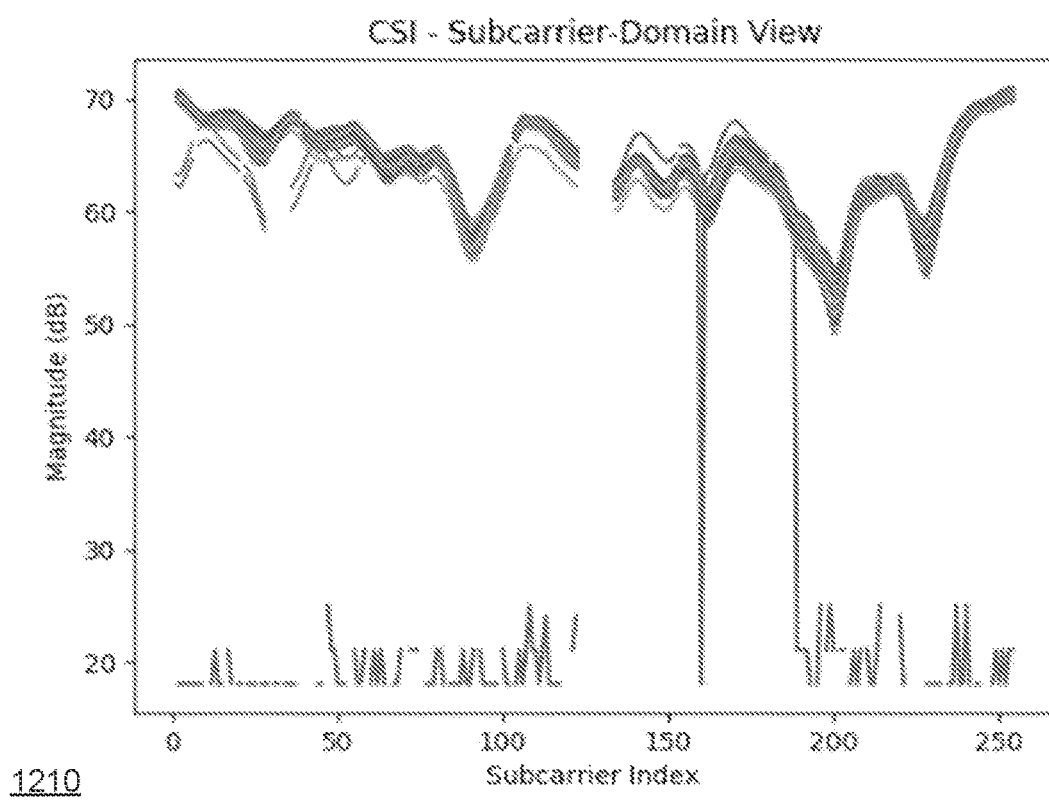
Figure 12B:
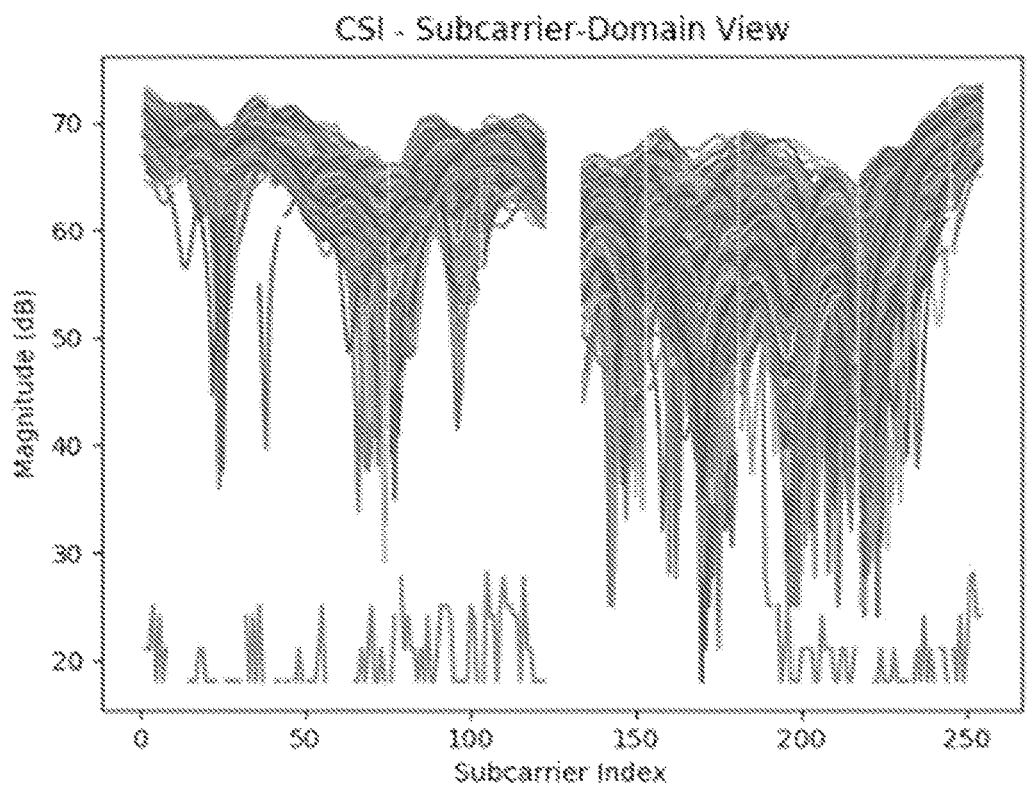

Examples of gesture detection based on subcarrier signal characteristics are illustrated in FIGS. 12A-B. Charts 1205-1215 of this example show subcarrier signal strengths for packets captured while an individual performs different gestures in a given space. Chart 1205 shows subcarrier signal strengths captured while a person is nodding their head. Chart 1210 shows subcarrier signal strengths captured while a person is shaking their head. In these charts, the motions are small, but still have a noticeable impact on the subcarrier characteristics illustrated in the graphs. As can be seen in the figure, certain subcarriers (e.g., between 50-100 of chart 1205) have more dramatic variance than others (e.g., between 0-25). Also, although the actions of nodding and shaking one's head are similar in motion and location, the charts show that the effect on subcarrier signal characteristics is still significant. Chart 1215 shows standing up and sitting down. In this example, with a much larger and substantial motion, the variance in the signal characteristics becomes much larger.

Figure 13:
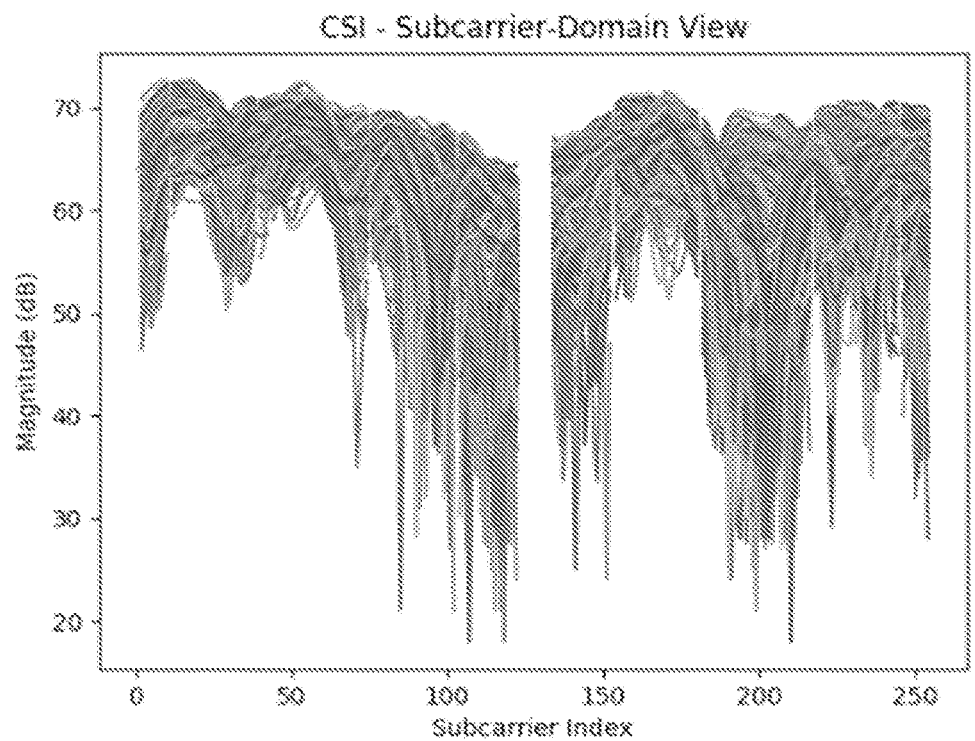
FIG. 13 illustrates examples of movement detection based on subcarrier signal characteristics in accordance with aspects of the disclosure.
Figure 13:
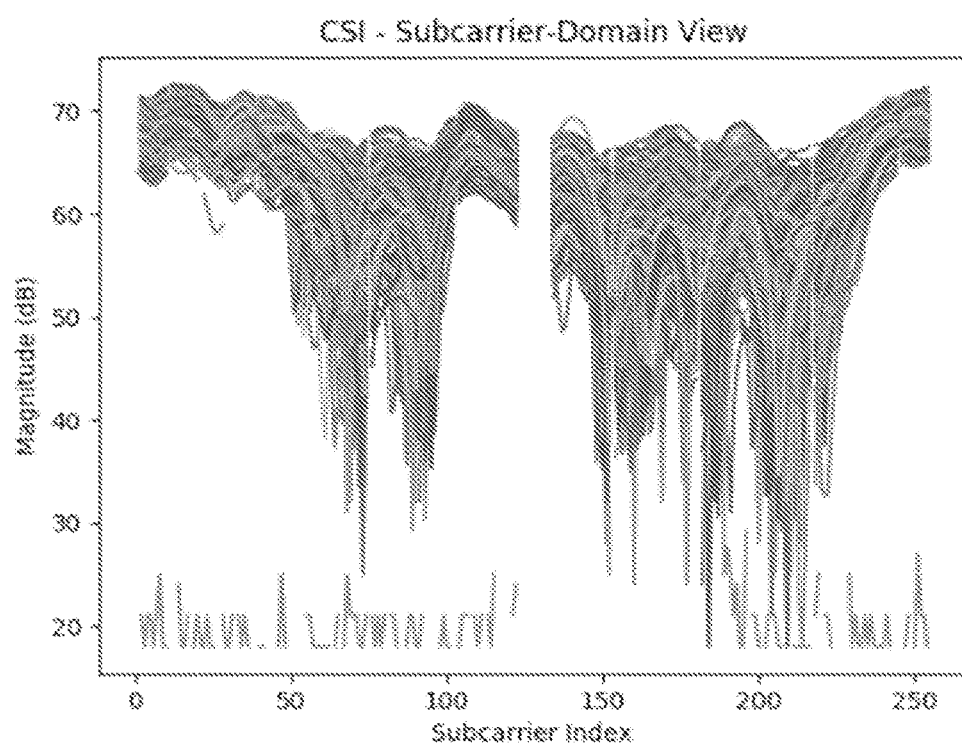

Examples of movement detection based on subcarrier signal characteristics in accordance with aspects of the disclosure are illustrated in FIG. 13. Chart 1305 shows subcarrier signal strengths captured while a person is walking parallel to the path between the transmitter and receiver. Chart 1310 shows subcarrier signal strengths captured while a person is walking perpendicular to the path between the transmitter and receiver. In some tests, classification models in accordance with a variety of embodiments have reached between 90%-99% accuracy, depending on various factors such as the measured gestures and the room environment (e.g., level of reflections, size, outside noise, etc.).

c. System i. State Detection Element

Figure 14:
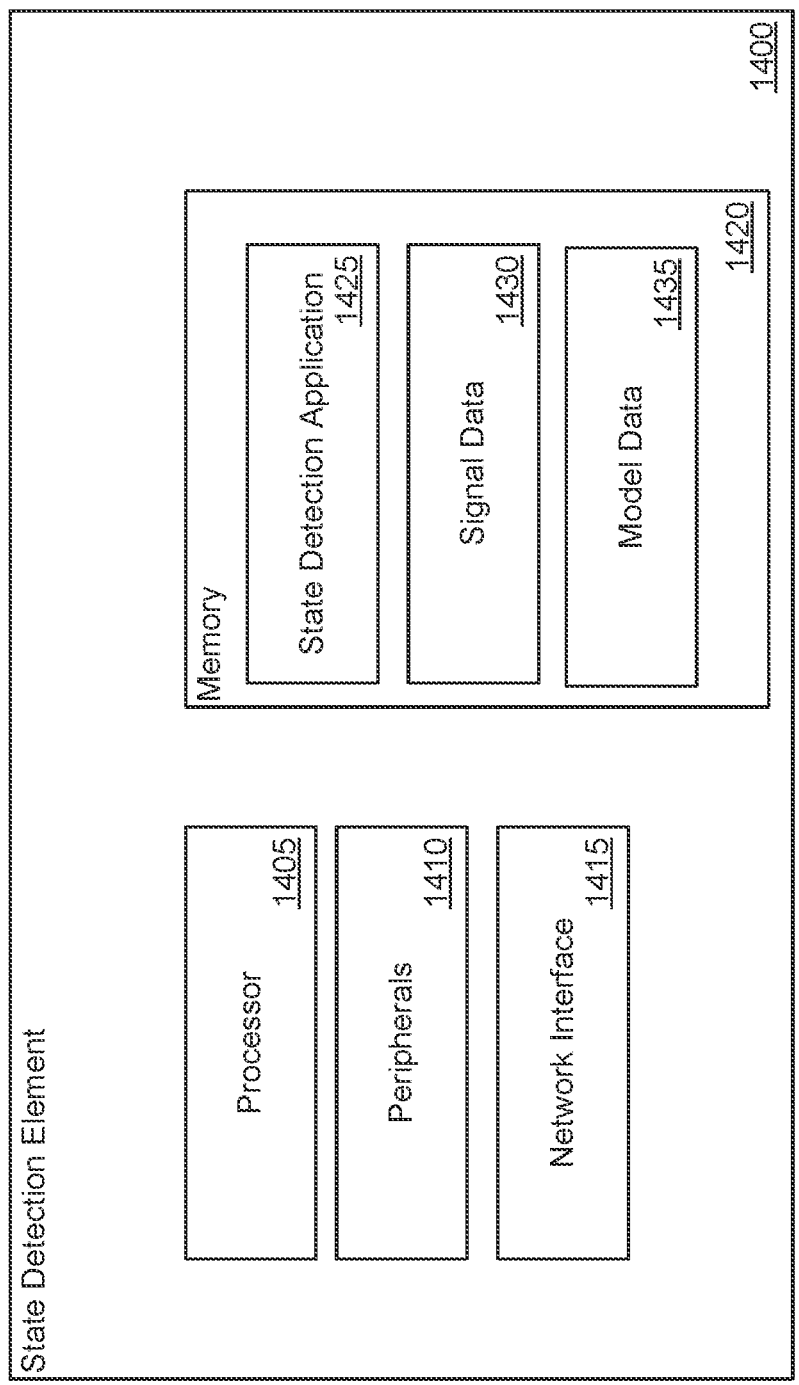
FIG. 14 illustrates an example of a state detection element that can execute instructions to perform processes to detect a state of individuals in a space in accordance with aspects of the disclosure.

An example of a state detection element that can execute instructions to perform processes that localize individuals in a wireless device system (e.g., a media player system) in accordance with various embodiments is shown in FIG. 14. State detection elements in accordance with many embodiments can include various networked devices, such as (but not limited to) one or more of portable devices, stationary playback devices, wireless speakers, Internet of Things (IoT) devices, cloud services, servers, and/or personal computers. In this example, state detection element 1400 includes processor 1405, peripherals 1410, network interface 1415, and memory 1420. One skilled in the art will recognize that a particular state detection element may not include some of the illustrated components and may include other components that are omitted for brevity without departing from the scope of the present disclosure.

The processor 1405 can include (but is not limited to) a processor, microprocessor, controller, or a combination of processors, microprocessor, and/or controllers that performs instructions stored in the memory 1420 to manipulate data stored in the memory. Processor instructions can configure the processor 1405 to perform processes in accordance with certain embodiments.

Peripherals 1410 can include any of a variety of components for capturing data, such as (but not limited to) cameras, displays, and/or sensors. In a variety of embodiments, peripherals can be used to gather inputs and/or provide outputs. Gathered inputs in accordance with certain embodiments can be used to provide context information for a state detection application. Network interface 1415 allows state detection element 1400 to transmit and receive data over a network based upon the instructions performed by processor 1405. Peripherals and/or network interfaces in accordance with many embodiments can be used to gather inputs (e.g., signal data, user inputs, and/or context information) that can be used to measure signal strengths for portions of a wireless channel and/or to localize individuals based on such signal strengths.

In several embodiments, network interfaces can interface directly with a wireless antenna to gather wireless signal data and/or signal strength data for portions of a wireless channel. Alternatively, or conjunctively, network interfaces in accordance with various embodiments can be used to collect signal strength data for portions of the wireless channel from other networked devices that receive and/or transmit the wireless signals. For example, systems in accordance with a number of embodiments can include reference devices for transmitting and receiving wireless signals and/ or signal strength data, as well as a coordinator device for localizing individuals in a given space based on signal strength data for the reference devices and/or the coordinator device. Coordinator devices in accordance with numerous embodiments may not collect their own wireless data, but rather can collect data from reference devices to perform state detection processes, such as those described herein.

Memory 1420 includes a state detection application 1425, signal data 1430, and model data 1435. State detection applications in accordance with several embodiments can be used to localize individuals in a networked system of devices. In numerous embodiments, signal data can include data captured at the state detection element. Signal data in accordance with a number of embodiments can include signal information (e.g., media data, sync data, null packets, etc.) received from other wireless devices in a system. In several embodiments, signal data can also include signal strength data for a wireless channel and/or for portions (e.g., subcarriers) of the wireless channel.

Model data in accordance with some embodiments can include parameters for a machine learning model trained to generate probabilistic location information based on input signal characteristics. In several embodiments, models can include a set of rules that can be used to interpret signal data to determine a state for individuals in a region as described throughout this specification.

Although a specific example of a state detection element 1400 is illustrated in FIG. 14, any of a variety of such elements can be utilized to perform processes similar to those described herein as appropriate to the requirements of specific applications in accordance with embodiments.

ii. State detection Application

Figure 15:
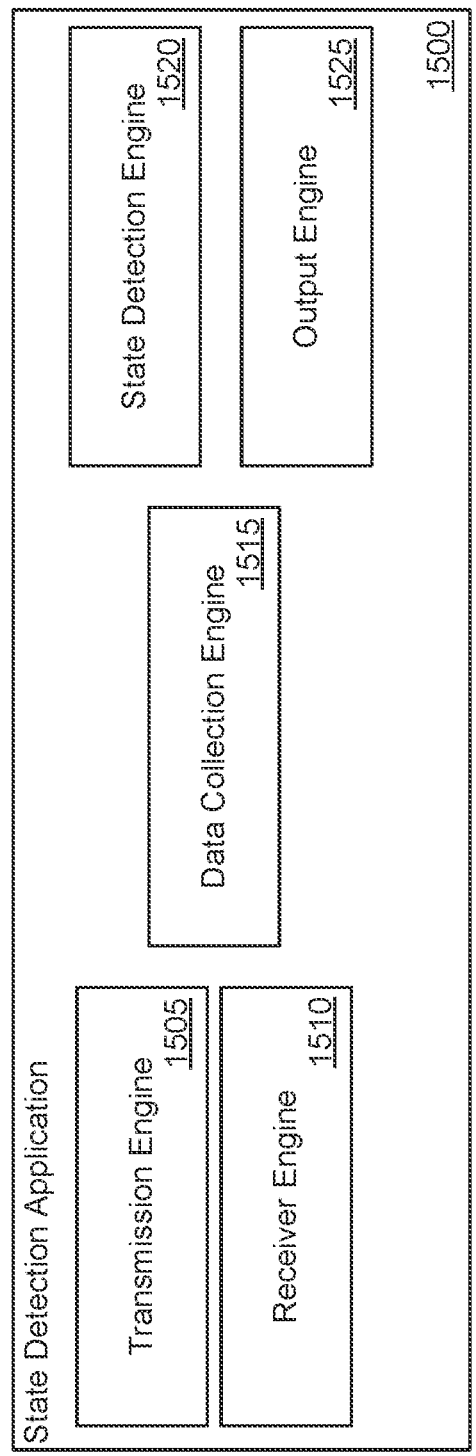
FIG. 15 illustrates an example of a state detection application in accordance with aspects of the disclosure.

FIG. 15 illustrates an example of a state detection application in accordance with an embodiment. State detection applications in accordance with a variety of embodiments can be used to perform processes for locating individuals in a networked system. In this example, the state detection application includes transmission engine 1505, receiver engine 1510, data collection engine 1515, state detection engine 1520, and output engine 1525. As can readily be appreciated, state detection applications can be implemented using any of a variety of configurations (e.g., with more or components) appropriate to the requirements of specific applications.

Transmission engines and receiver engines in accordance with a variety of embodiments can be used to transmit and receive signals between devices of a system. Transmission engines in accordance with many embodiments can transmit wireless signals for various purposes, such as (but not limited to) media playback, playback synchronization, playback device controls, device configuration, etc. In many embodiments, transmission engines can broadcast wireless signals as part of a periodic wireless scan. Receiver engines in accordance with certain embodiments can receive signals transmitted by other devices in the system.

Data collection engine 1515 collects signal data from the other devices of a system. In many embodiments, data collection engines can also perform some pre-processing and/or cleaning (e.g., de-noising) of the signal data. In a number of embodiments, pre-processing and/or cleaning are distributed between a coordinator device and one or more reference devices. Data collection engines in accordance with a number of embodiments can maintain a history of signal data in order to compute statistics (e.g., weighted averages) of the historic signal data. In some embodiments, data collection engines can collect signal strength data via the receiver engine and/or through a network. Signal strength data in accordance with a number of embodiments can include strength data for individual portions (e.g., subcarriers) of the wireless channel. In various embodiments, the collected data for signals between wireless devices can be normalized. Normalizing signal characteristics in accordance with some embodiments can include calculating an average of the strengths for the sent and received signals of a signal path between two devices of the system.

State detection engines in accordance with a number of embodiments can compute a state (e.g., location, count, etc.) of a region between wireless devices of a system. In various embodiments, state detection engines can include a machine-learned model to predict (or classify) a state based on the signal strengths of portions of a wireless channel. For example, state detection engines in accordance with many embodiments can be trained to predict a desired configuration for a system (e.g., balance levels, volume levels, etc.), a classification of the state of the region (e.g., crowded, unoccupied, etc.), a number of individuals in the region, locations of individuals in the region, etc. In some embodiments, state detection engines can take as input signal strength data for portions of a wireless channel, context information, etc.

In a variety of embodiments, output engines can provide outputs to a display, transmit instructions and/or information to devices in a system based on outputs of the state detection engine. Outputs of output engines in accordance with some embodiments can include (but are not limited to) notifications, alerts, playback controls, control messages, configuration settings, etc.

Although a specific example of a state detection application 1500 is illustrated in FIG. 15, any of a variety of state detection applications can be utilized to perform processes for localizing portable devices similar to those described herein as appropriate to the requirements of specific applications in accordance with embodiments. In some embodiments, one or more of the above elements may be omitted and/or additional elements may be added.

IV. Conclusion

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided are not the only way(s) to implement such systems, methods, apparatus, and/or articles of manufacture.

Further, the examples described herein may be employed in systems separate and apart from media playback systems such as any Internet of Things (IoT) system comprising an IoT device. An IoT device may be, for example, a device designed to perform one or more specific tasks (e.g., making coffee, reheating food, locking a door, providing power to another device, playing music) based on information received via a network (e.g., a WAN such as the Internet). Example IoT devices include a smart thermostat, a smart doorbell, a smart lock (e.g., a smart door lock), a smart outlet, a smart light, a smart vacuum, a smart camera, a smart television, a smart kitchen appliance (e.g., a smart oven, a smart coffee maker, a smart microwave, and a smart refrigerator), a smart home fixture (e.g., a smart faucet, a smart showerhead, smart blinds, and a smart toilet), and a smart speaker (including the network accessible and/or voice-enabled playback devices described above). These IoT systems may also comprise one or more devices that communicate with the IoT device via one or more networks such as one or more cloud servers (e.g., that communicate with the IoT device over a WAN) and/or one or more computing devices (e.g., that communicate with the IoT device over a LAN and/or a PAN). Thus, the examples described herein are not limited to media playback systems.

It should be appreciated that references to transmitting information to particular components, devices, and/or systems herein should be understood to include transmitting information (e.g., messages, requests, responses) indirectly or directly to the particular components, devices, and/or systems. Thus, the information being transmitted to the particular components, devices, and/or systems may pass through any number of intermediary components, devices, and/or systems prior to reaching its destination. For example, a control device may transmit information to a playback device by first transmitting the information to a computing system that, in turn, transmits the information to the playback device. Further, modifications may be made to the information by the intermediary components, devices, and/or systems. For example, intermediary components, devices, and/or systems may modify a portion of the information, reformat the information, and/or incorporate additional information.

Similarly, references to receiving information from particular components, devices, and/or systems herein should be understood to include receiving information (e.g., messages, requests, responses) indirectly or directly from the particular components, devices, and/or systems. Thus, the information being received from the particular components, devices, and/or systems may pass through any number of intermediary components, devices, and/or systems prior to being received. For example, a control device may receive information from a playback device indirectly by receiving information from a cloud server that originated from the playback device. Further, modifications may be made to the information by the intermediary components, devices, and/or systems. For example, intermediary components, devices, and/or systems may modify a portion of the information, reformat the information, and/or incorporate additional information.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the forgoing description of embodiments.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

Example Features (Feature 1) A playback device comprising: a wireless network interface configured to connect to at least one data network; one or more processors; one or more non-transitory computer-readable media; program instructions stored on the one or more non-transitory computer-readable media that are executable by the one or more processors such that the playback device is configured to: receive wireless signal strength data for signals transmitted along signal paths between a plurality of wireless playback devices transmitting on a wireless channel during synchronous playback of media content by the plurality of wireless playback devices; determine a first signal strength for each of a plurality of portions of the wireless channel; for each signal path between each of the plurality of wireless playback devices, calculate a difference in the determined first signal strength from a second signal strength for each of the plurality of subcarriers; and determine, based on the calculated differences, a state for a set of one or more individuals in the region.

(Feature 2) The playback device of feature 1, wherein the wireless signal strength data comprises signal strengths for the plurality of subcarriers of the wireless channel.

(Feature 3) The playback device of feature 1, wherein the signals transmitted along the signal paths comprise at least one of audio data packets, synchronization packets, or null packets.

(Feature 4) The playback device of feature 1, wherein the width of the wireless channel is greater than 13 megahertz (MHz) and a width of each subcarrier is less than one MHz.

(Feature 5) The playback device of feature 1, wherein the program instructions that are executable by the one or more processors such that the playback device is configured to determine the first signal strength comprise program instructions that are executable by the one or more processors such that the playback device is configured to: determine a first directional signal strength in a first direction along a signal path between two wireless playback devices of the plurality of playback devices; determine a second directional signal strength in a second direction along the signal path between the two wireless playback devices; and calculate a normalized signal strength based on the first and second directional signal strengths.

(Feature 6) The playback device of feature 1, wherein the plurality of subcarriers comprises subcarriers at frequencies that are attenuated by water at a rate exceeding a given threshold.

(Feature 7) The playback device of feature 1 further comprising program instructions that are executable by the one or more processors such that the playback device is configured to apply a set of one or more denoising filters to the determined first signal strengths for the plurality of subcarriers, wherein determining the state of the individual is based on the filtered first signal strengths.

(Feature 8) The playback device of feature 7, wherein the set of denoising filters comprises at least one of a linear Kalman filter, an extended Kalman filter, or a moving horizon estimator.

(Feature 9) The playback device of feature 1, wherein the second signal strength is a baseline signal strength measured prior to the determined first signal strength.

(Feature 10) The playback device of feature 1, wherein the program instructions that are executable by the one or more processors such that the playback device is configured to determine the state of the set of individuals comprise program instructions that are executable by the one or more processors such that the playback device is configured to determine a number of individuals in the region.

(Feature 11) The playback device of feature 1, wherein the program instructions that are executable by the one or more processors such that the playback device is configured to determine the state of the set of individuals comprise program instructions that are executable by the one or more processors such that the playback device is configured to determine a location of an individual in the region.

(Feature 12) The playback device of feature 11, wherein the program instructions that are executable by the one or more processors such that the playback device is configured to determine the location comprise program instructions that are executable by the one or more processors such that the playback device is configured to determine that the individual is in the line-of-sight path between two of the plurality of wireless playback devices.

(Feature 13) The playback device of feature 1, wherein the program instructions that are executable by the one or more processors such that the playback device is configured to determine the state of the set of individuals comprise program instructions that are executable by the one or more processors such that the playback device is configured to determine the state of the set of individuals using a model, wherein the model comprises at least one of a convolutional neural network, a recurrent neural network, a decision tree, or a logistic regression.

(Feature 14) The playback device of feature 1, further comprising program instructions that are executable by the one or more processors such that the playback device is configured to: receive state information that describes the region, wherein the state information comprises at least one of the group consisting of room characteristics and locations of each of the playback devices; and determine a likelihood of background noise for each of the plurality of subcarriers, wherein determining the state of the set of individuals is based on the determined likelihood of background noise.

(Feature 15) The playback device of feature 1, further comprising program instructions that are executable by the one or more processors such that the playback device is configured to modify the wireless playback system based on the determined state of the set of individuals.

(Feature 16) The playback device of feature 15, wherein the program instructions that are executable by the one or more processors such that the playback device is configured to modify the wireless playback system comprise program instructions that are executable by the one or more processors such that the playback device is configured to adjust audio playback settings of at least one of the plurality of wireless playback devices.

(Feature 17) The playback device of feature 15, wherein: the program instructions that are executable by the one or more processors such that the playback device is configured to determine the state of the set of individuals comprise program instructions that are executable by the one or more processors such that the playback device is configured to determine a number of individuals in the region; and the program instructions that are executable by the one or more processors such that the playback device is configured to modify the wireless playback system comprise program instructions that are executable by the one or more processors such that the playback device is configured to return the audio playback settings of the plurality of wireless playback devices to a default setting when the number of individuals exceeds a threshold.

(Feature 18) The playback device of feature 1, further comprising program instructions that are executable by the one or more processors such that the playback device is configured to: detect unusual activity based on the determined state; and upon detecting unusual activity, initiate a safety measure, wherein the safety measure comprises at least one of the group consisting of sending an alert to a mobile device, triggering an alarm, and initiating a recording of the region.

(Feature 19) The playback device of feature 1, wherein the program instructions that are executable by the one or more processors such that the playback device is configured to receive the wireless signal strength data comprise program instructions that are executable by the one or more processors such that the playback device is configured to receive wireless signal strength data from a subset of the plurality of wireless playback devices.

(Feature 20) The playback device of feature 1, wherein the portions of the wireless channel are at least one of subcarriers or subchannels.

(Feature 21) A method for managing a playback system based on individuals within a region, the method comprising: receiving wireless signal strength data for signals transmitted along signal paths between a plurality of wireless playback devices transmitting on a wireless channel during synchronous playback of media content by the plurality of wireless playback devices; determining a first signal strength for each of a plurality of portions of the wireless channel; for each signal path between each of the plurality of wireless playback devices, calculating a difference in the determined first signal strength from a second signal strength for each of the plurality of subcarriers; and determining, based on the calculated differences, a state for a set of one or more individuals in the region.

(Feature 21) A non-transitory machine readable medium containing processor instructions, where execution of the instructions by at least one processor causes the at least one processor to perform a process comprising: receiving wireless signal strength data for signals transmitted along signal paths between a plurality of wireless playback devices transmitting on a wireless channel; determining a first signal strength for each of a plurality of subcarriers of the wireless channel; for each signal path between each of the plurality of wireless playback devices, calculating a difference in the determined first signal strength from a second signal strength for each of the plurality of subcarriers; and determining, based on the calculated differences, a state for a set of one or more individuals in the region.

(Feature 22) A playback device comprising: a wireless network interface configured to connect to at least one data network; one or more processors; one or more non-transitory computer-readable media; program instructions stored on the one or more non-transitory computer-readable media that are executable by the one or more processors such that the playback device is configured to: receive wireless signal data for first and second signals transmitted along each of a set of signal paths between a plurality of wireless playback devices transmitting on a wireless channel during synchronous playback of media content by the plurality of wireless playback devices; for each signal path of the set of signal paths: determine signal strengths based on the received wireless signal data for each of a set of portions of the wireless channel for each of the first and second signals, wherein a width of each portion of the set of portions is less than half of a width of the wireless channel; and calculate a difference, between the first and second signals, in the determined signal strengths for each portion of the set of portions; determine, based on the calculated differences for the set of portions for the set of signal paths, a state for a set of individuals in a region between the plurality of playback devices; and modify a state variable of a wireless playback device of the plurality of wireless playback devices to modify the synchronous playback based on the determined state.

(Feature 23) A playback device comprising: a wireless network interface configured to connect to at least one data network; one or more processors; one or more non-transitory computer-readable media; program instructions stored on the one or more non-transitory computer-readable media that are executable by the one or more processors such that the playback device is configured to: receive wireless signal strength data for signals transmitted along signal paths between a plurality of wireless playback devices transmitting on a wireless channel during synchronous playback of media content by the plurality of wireless playback devices; determine a first signal strength for each of a plurality of portions of the wireless channel; for each signal path between each of the plurality of wireless playback devices, calculate a difference in the determined first signal strength from a second signal strength for each of the plurality of subcarriers; and detect, based on the calculated differences, at least one gesture performed by a set of one or more individuals in the region.

(Feature 24) A playback device comprising: a wireless network interface configured to connect to at least one data network; one or more processors; one or more non-transitory computer-readable media; program instructions stored on the one or more non-transitory computer-readable media that are executable by the one or more processors such that the playback device is configured to: receive wireless signal data for signals transmitted along signal paths between a plurality of wireless playback devices transmitting on a wireless channel during synchronous playback of media content by the plurality of wireless playback devices; determine channel state information (CSI) for a plurality of portions of the wireless channel; and determine whether at least one gesture is performed by a set of one or more individuals in the region by: providing, to a model, the determined CSI for the plurality of portions of the wireless channel for each signal path between each of the plurality of wireless playback devices; and determining the at least one gesture based on the provided CSI.

(Feature 25) The playback device of feature 24, wherein each portion of the portions of the wireless channel are subcarriers of the wireless channel.

(Feature 26) The playback device of feature 25, wherein the CSI comprises I/Q component data for each subcarrier of the wireless channel.

(Feature 27) The playback device of feature 24, wherein the model is one of a convolutional neural network (CNN) or a recurrent neural network (RNN).

(Feature 28) The playback device of feature 24, wherein the program instructions that are executable by the one or more processors such that the playback device is configured to determine whether at least one gesture is performed further comprise program instructions that are executable by the one or more processors such that the playback device is configured to determine whether the set of individuals performs at least one of sitting down, standing up, walking parallel to a link, reading out loud, shaking one's head, nodding one's head, or moving one's hand from side to side.

(Feature 29) The playback device of feature 24, further comprising program instructions that are executable by the one or more processors such that the playback device is configured to modify parameters of the plurality wireless playback devices based on the determined at least one gesture.

(Feature 30) The playback device of feature 29, wherein the parameters comprise at least one of a volume, a balance, or a fade.

(Feature 31) The playback device of feature 29, wherein: the program instructions that are executable by the one or more processors such that the playback device is configured to determine whether at least one gesture is performed further comprise program instructions that are executable by the one or more processors such that the playback device is configured to determine whether an individual is speaking; and the program instructions that are executable by the one or more processors such that the playback device is configured to modify parameters of the plurality of wireless devices comprise program instructions that are executable by the one or more processors such that the playback device is configured to lower a volume of at least one of at least one playback device of the plurality of wireless devices.

(Feature 32) A playback device comprising: a wireless network interface configured to facilitate communication over at least one data network; one or more processors; one or more non-transitory computer-readable media; program instructions stored on the one or more non-transitory computer-readable media that are executable by the one or more processors such that the playback device is configured to: during synchronous playback of media content by a plurality of playback devices including the playback device, receive wireless signal strength data for signals transmitted along signal paths between at least some of the plurality of playback devices transmitting in a wireless channel; determine a first signal strength for each of a plurality of portions of the wireless channel; for each of the signal paths between at least some of the plurality of playback devices, calculate a difference in the determined first signal strength from a second signal strength for each of the plurality of subcarriers; and determine, based on the calculated differences, a state for a set of one or more individuals in a region between the plurality of playback devices.

(Feature 33) The playback device of feature 32, wherein the signals transmitted along the signal paths comprise at least one of: an audio packet, a network time protocol packet, or a null packet.

(Feature 34) The playback device of feature 32, wherein the width of the wireless channel is greater than 13 megahertz (MHz) and a width of each subcarrier is less than one MHz.

(Feature 35) The playback device of feature 32, wherein the second signal strength is a baseline signal strength measured prior to the determined first signal strength.

(Feature 36) The playback device of feature 32, wherein the program instructions that are executable by the one or more processors such that the playback device is configured to determine the state of the set of individuals comprise program instructions that are executable by the one or more processors such that the playback device is configured to determine a number of individuals in the region.

(Feature 37) The playback device of feature 32, wherein the program instructions that are executable by the one or more processors such that the playback device is configured to determine the state of the set of individuals comprise program instructions that are executable by the one or more processors such that the playback device is configured to determine a location of an individual in the region.

(Feature 38) The playback device of feature 37, wherein the program instructions that are executable by the one or more processors such that the playback device is configured to determine the location of the individual in the region comprise program instructions that are executable by the one or more processors such that the playback device is configured to determine that the individual is in the line-of-sight path between at least two of the plurality of playback devices.

(Feature 39) The playback device of feature 32, wherein the program instructions that are executable by the one or more processors such that the playback device is configured to determine the state of the set of individuals comprise program instructions that are executable by the one or more processors such that the playback device is configured to determine the state of the set of individuals using a model, wherein the model comprises at least one of a convolutional neural network, a recurrent neural network, a decision tree, or a logistic regression.

(Feature 40) The playback device of feature 32, further comprising program instructions that are executable by the one or more processors such that the playback device is configured to modify operation of at least one of the plurality of playback devices based on the determined state of the set of individuals.

(Feature 41) The playback device of feature 40, wherein the program instructions that are executable by the one or more processors such that the playback device is configured to modify operation of the at least one of the plurality of playback devices comprise program instructions that are executable by the one or more processors such that the playback device is configured to adjust audio playback settings of the at least one of the plurality of playback devices.

(Feature 42) The playback device of feature 41, wherein the program instructions that are executable by the one or more processors such that the playback device is configured to determine the state of the set of individuals comprise program instructions that are executable by the one or more processors such that the playback device is configured to determine a number of individuals in the region.

(Feature 43) The playback device of feature 42, wherein the program instructions that are executable by the one or more processors such that the playback device is configured to modify the wireless playback system comprise program instructions that are executable by the one or more processors such that the playback device is configured to return the audio playback settings of the plurality of playback devices to a default setting when the number of individuals exceeds a threshold.

(Feature 44) A playback device comprising: a wireless network interface configured to facilitate communication over at least one data network; one or more processors; one or more non-transitory computer-readable media; program instructions stored on the one or more non-transitory computer-readable media that are executable by the one or more processors such that the playback device is configured to: during synchronous playback of media content by a plurality of playback devices including the playback device, receive wireless signal data for first and second signals transmitted along each of a set of signal paths between at least some of the plurality of playback devices transmitting on a wireless channel; for each signal path of the set of signal paths: determine signal strengths based on the received wireless signal data for each of a set of portions of the wireless channel for each of the first and second signals, wherein a width of each portion of the set of portions is less than half of a width of the wireless channel; and calculate a difference, between the first and second signals, in the determined signal strengths for each portion of the set of portions; determine, based on the calculated differences for the set of portions for the set of signal paths, a state for a set of individuals in a region between the plurality of playback devices; and cause a state variable of at least one playback device of the plurality of playback devices to be modified based on the determined state.

(Feature 45) A playback device comprising: a wireless network interface configured to facilitate communication over at least one data network; one or more processors; one or more non-transitory computer-readable media; program instructions stored on the one or more non-transitory computer-readable media that are executable by the one or more processors such that the playback device is configured to: during synchronous playback of media content by a plurality of playback devices including the playback device, receive wireless signal data for signals transmitted along signal paths between at least some of the plurality of playback devices transmitting on a wireless channel; based on the wireless signal data, determine channel state information (CSI) indicative of a state of the wireless channel along at least one of the signal paths; and determine whether at least one gesture is performed by a set of one or more individuals in a region between the plurality of playback devices at least in part by: providing, to at least one model, the determined CSI for the plurality of portions of the wireless channel along the at least one of the signal paths; and determining, using the at least one model, the at least one gesture based on the provided CSI.

(Feature 46) The playback device of feature 45, wherein each portion of the portions of the wireless channel are subcarriers of the wireless channel.

(Feature 47) The playback device of feature 45, wherein the CSI comprises In-phase and Quadrature component data for each subcarrier of the wireless channel.

(Feature 48) The playback device of feature 45, wherein the at least one model comprises one of a convolutional neural network (CNN) or a recurrent neural network (RNN).

(Feature 49) The playback device of feature 45, wherein the program instructions that are executable by the one or more processors such that the playback device is configured to determine whether at least one gesture is performed further comprise program instructions that are executable by the one or more processors such that the playback device is configured to determine whether the set of individuals performs at least one of sitting down, standing up, walking parallel to a link, reading out loud, shaking one's head, nodding one's head, or moving one's hand from side to side.

(Feature 50) The playback device of feature 45, further comprising program instructions that are executable by the one or more processors such that the playback device is configured to modify parameters of at least one of the plurality playback devices based on the determined at least one gesture.

(Feature 51) The playback device of feature 50, wherein the parameters comprise at least one of a volume, a balance, or a fade.

The invention claimed is:

1. A playback device comprising:
a wireless network interface configured to facilitate communication over at least one data network;
one or more processors;
one or more non-transitory computer-readable media; and
program instructions stored on the one or more non-transitory computer-readable media that are executable by the one or more processors such that the playback device is configured to:
playback media content synchronously with at least one other playback device;
during synchronous playback of media content by a plurality of playback devices, including the playback device and the at least one other playback device, receive wireless signal data for signals transmitted in a wireless channel along at least one signal path between at least some of the plurality of playback devices when in communication;

based on the wireless signal data, determine information indicative of a state of the wireless channel;

wherein the state of the wireless channel is determined through an assessment of subcarriers of the wireless channel;

determine whether at least one gesture is performed by a set of one or more individuals, wherein determining whether the at least one gesture is performed comprises:

providing, to at least one model, the information indicative of the state of the wireless channel; and determining, using the at least one model, the at least one gesture based on the state of the wireless channel; and when the at least one gesture is determined, modify the playback of the media content based on the determined at least one gesture.

2. The playback device of claim 1, wherein the assessment is performed on In-phase and Quadrature component data for each subcarrier of the wireless channel.

3. The playback device of claim 1, wherein the at least one model comprises one or more of a convolutional neural network (CNN) or a recurrent neural network (RNN).

4. The playback device of claim 1, wherein the program instructions that are executable by the one or more processors such that the playback device is configured to determine whether at least one gesture is performed further comprise determining whether the set of one or more individuals performs at least one of sitting down, standing up, walking parallel to a link, reading out loud, shaking one's head, nodding one's head, or moving one's hand from side to side.

5. The playback device of claim 1, further comprising program instructions that are executable by the one or more processors such that the playback device is configured to modify parameters of at least one of the plurality of playback devices based on the determined at least one gesture, wherein at least one parameter comprises at least one of: a volume, a balance, or a fade.

6. The playback device of claim 1, wherein modifying the playback of the media content comprises initiating, through one or more of the plurality of playback devices, at least one of a play of media content, pause of media content, fast forward of media content, rewind of media content, skip to subsequent media content, skip to previous media content, enter into shuffle mode, exit from shuffle mode, enter into repeat mode, exit from repeat mode, enter into cross fade mode, or exit from cross fade mode.

7. A method for operating a playback device, the method comprising:

playing back media content synchronously with at least one other playback device;

during synchronous playback of media content by a plurality of playback devices, including the playback device and the at least one other playback device, receiving wireless signal data for signals transmitted in a wireless channel along at least one signal path between at least some of the plurality of playback devices when in communication;

based on the wireless signal data, determining information indicative of a state of the wireless channel;

wherein the state of the wireless channel is determined through an assessment of subcarriers of the wireless channel;

determining whether at least one gesture is performed by one or more individuals, wherein determining whether the at least one gesture is performed comprises:

providing, to at least one model, information indicative of the state of the wireless channel; and determining, using the at least one model, the at least one gesture based on the state of the wireless channel; and when the at least one gesture is determined, modifying the playback of the media content based on the determined at least one gesture.

8. The method of claim 7, wherein In-phase and Quadrature component data is assessed for each subcarrier of the wireless channel.

9. The method of claim 7, wherein the at least one model comprises one or more of a convolutional neural network (CNN) or a recurrent neural network (RNN).

10. The method of claim 7, wherein determining whether at least one gesture is performed further comprises determining whether the set of one or more individuals performs at least one of sitting down, standing up, walking parallel to a link, reading out loud, shaking one's head, nodding one's head, or moving one's hand from side to side.

11. The method of claim 7, further comprising modifying parameters of at least one of the plurality of playback devices based on the determined at least one gesture.

12. The method of claim 11, wherein at least one parameter comprises at least one of a volume, a balance, or a fade.

13. The method of claim 7, wherein modifying the playback of the media content comprises initiating, through one or more of the plurality of playback devices, at least one of a play of media content, pause of media content, fast forward of media content, rewind of media content, skip to subsequent media content, skip to previous media content, enter into shuffle mode, exit from shuffle mode, enter into repeat mode, exit from repeat mode, enter into cross fade mode, or exit from cross fade mode.

14. A non-transitory computer-readable medium storing instructions that, when executed by a processor, are configured to cause the processor to perform operations for modifying operation of a playback device, the operations comprising:

playing back media content synchronously with at least one other playback device;

during synchronous playback of media content by a plurality of playback devices, including the playback device and the at least one other playback device, receiving wireless signal data for signals transmitted in a wireless channel along at least one signal path between at least some of the plurality of playback devices when in communication;

based on the wireless signal data, determining information indicative of a state of the wireless channel;

wherein the state of the wireless channel is determined through an assessment of subcarriers of the wireless channel;

determining whether at least one gesture is performed by a one or more individuals, wherein determining whether the at least one gesture is performed comprises:

providing, to at least one model, the information indicative of the state of the wireless channel; and determining, using the at least one model, the at least one gesture based on the state of the wireless channel; and when the at least one gesture is determined, modifying the playback of the media content based on the determined at least one gesture.

15. The non-transitory computer-readable medium of claim 14,
wherein In-phase and Quadrature component data is assessed for each subcarrier of the wireless channel.

16. The non-transitory computer-readable medium of claim 14, wherein the at least one model comprises one or more of a convolutional neural network (CNN) or a recurrent neural network (RNN).

17. The non-transitory computer-readable medium of claim 14, wherein determining whether at least one gesture is performed further comprises determining whether the set of one or more individuals performs at least one of sitting down, standing up, walking parallel to a link, reading out loud, shaking one's head, nodding one's head, or moving one's hand from side to side.

18. The non-transitory computer-readable medium of claim 14, further comprising modifying parameters of at least one of the plurality of playback devices based on the determined at least one gesture.

19. The non-transitory computer-readable medium of claim 18, wherein at least one parameter comprises at least one of a volume, a balance, or a fade.

20. The non-transitory computer-readable medium of claim 14, wherein modifying the playback of the media content comprises initiating, through one or more of the plurality of playback devices, at least one of a play of media content, pause of media content, fast forward of media content, rewind of media content, skip to subsequent media content, skip to previous media content, enter into shuffle mode, exit from shuffle mode, enter into repeat mode, exit from repeat mode, enter into cross fade mode, or exit from cross fade mode.

* * * * *